United States Patent
Song et al.

(10) Patent No.: US 11,244,584 B2
(45) Date of Patent: Feb. 8, 2022

(54) IMAGE PROCESSING METHOD AND DEVICE FOR PROJECTING IMAGE OF VIRTUAL REALITY CONTENT

(71) Applicants: Samsung Electronics Co., Ltd., Suwon-si (KR); KOREA UNIVERSITY RESEARCH AND BUSINESS FOUNDATION, Seoul (KR)

(72) Inventors: Jae-Yeon Song, Seoul (KR); Sung-Jea Ko, Seoul (KR); Eric Yip, Seoul (KR); Byeong-Doo Choi, Suwon-si (KR); Sung-Ho Lee, Bucheon-si (KR); Sung-Tae Kim, Seoul (KR)

(73) Assignees: Samsung Electronics Co., Ltd., Suwon-si (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 16/332,304

(22) PCT Filed: Sep. 12, 2017

(86) PCT No.: PCT/KR2017/009994
§ 371 (c)(1),
(2) Date: Mar. 11, 2019

(87) PCT Pub. No.: WO2018/048287
PCT Pub. Date: Mar. 15, 2018

(65) Prior Publication Data
US 2019/0236990 A1 Aug. 1, 2019

(30) Foreign Application Priority Data
Sep. 12, 2016 (KR) .......... 10-2016-0117000

(51) Int. Cl.
*G06T 19/00* (2011.01)
*G06T 15/20* (2011.01)
(Continued)

(52) U.S. Cl.
CPC .......... *G09G 3/001* (2013.01); *G06T 3/0043* (2013.01); *G06T 3/0062* (2013.01); *G06T 7/11* (2017.01);
(Continued)

(58) Field of Classification Search
CPC .... G06T 3/0031; G06T 3/0037; G06T 3/0043
See application file for complete search history.

(56) References Cited

U.S. PATENT DOCUMENTS 8,217,956 B1 7/2012 Jin
2004/0247173 A1* 12/2004 Nielsen ............... H04N 5/2628
382/154
(Continued)

FOREIGN PATENT DOCUMENTS

KR 10-2010-0008649 A 1/2010
KR 10-1359011 B1 2/2014

OTHER PUBLICATIONS

Yu et al., Content Adaptive Representations of Omnidirectional Videos for Cinematic Virtual Reality, XP058074923, Oct. 30, 2015, Brisbane, Australia.
(Continued)

*Primary Examiner* — Brian T Pendleton
*Assistant Examiner* — Frank Johnson
(74) *Attorney, Agent, or Firm* — Jefferson IP Law, LLP

(57) ABSTRACT

The present invention relates to a technology for a sensor network, machine to machine (M2M) communication, machine type communication (MTC), and the Internet of things (IoT). The present invention can be utilized for intelligent services (smart home, smart building, smart city,
(Continued)

smart car or connected car, health care, digital education, retail, security and safety-related services, and the like) based on the technology. The present invention relates to an efficient image processing method and device for virtual reality content, and according to one embodiment of the present invention, the image processing method for projecting an image of virtual reality content comprises the steps of: acquiring a first planar image projected by dividing a front part and a rear part of a spherical image for expressing a 360-degree image; generating a second planar image projected by sampling the first planar image on the basis of a pixel position; and encoding the second planar image.

15 Claims, 33 Drawing Sheets

(51) Int. Cl.
  *G09G 3/00* (2006.01)
  *G09F 19/18* (2006.01)
  *G06T 3/00* (2006.01)
  *G06T 7/11* (2017.01)

(52) U.S. Cl.
  CPC .............. *G06T 15/20* (2013.01); *G06T 19/00* (2013.01); *G09F 19/18* (2013.01); *G06T 2207/10016* (2013.01)

(56) References Cited

U.S. PATENT DOCUMENTS

| | | | |
|---|---|---|---|
| 2006/0257049 A1 | 11/2006 | Lelescu et al. | |
| 2009/0167886 A1* | 7/2009 | Tonomura | G06T 3/0031 348/222.1 |
| 2015/0016746 A1* | 1/2015 | Tsubota | G06T 3/00 382/275 |
| 2016/0142697 A1 | 5/2016 | Budagavi et al. | |
| 2017/0236252 A1* | 8/2017 | Nguyen | G06T 15/00 345/419 |
| 2017/0280126 A1* | 9/2017 | Van der Auwera | G06T 3/0062 |
| 2018/0152682 A1* | 5/2018 | Wozniak | H04N 19/44 |
| 2018/0167613 A1* | 6/2018 | Hannuksela | H04N 19/17 |
| 2018/0268517 A1* | 9/2018 | Coban | H04N 19/174 |
| 2018/0359459 A1* | 12/2018 | Lee | G06T 3/005 |
| 2019/0200023 A1* | 6/2019 | Hanhart | H04N 19/184 |
| 2019/0215532 A1* | 7/2019 | He | H04N 19/172 |
| 2019/0268595 A1* | 8/2019 | Wang | G06T 3/0087 |

OTHER PUBLICATIONS

Chang et al., Rectangling Stereographic Projection for Wide-Angle Image Visualization, XP 032572783, Dec. 1, 2013, 2013 IEEE International Conference on Computer Vision.
Alface et al., Interactive omnidirectional video delivery, A bandwidth-effective approach, XP 011627983, Mar. 1, 2012, Beil Labs Technical Journal.
European Search Report dated Jul. 31, 2019, issued in European Patent Application No. 17849171.8.
German et al., New methods to project panoramas for practical and aesthetic purposes, Computational Aesthetics in Graphics, Visualization, and Imaging, XP 002523600, Jul. 1, 2007.
Peirce, A Quincuncial Projection of the Sphere, XP 55754062, Dec. 1, 1879.
Snyder, Map Projections—A Working Manual, Equidistant Cylindrical Projection, XP 55754879, Jan. 1, 1987, Washington, DC.
European Examination Report dated Dec. 3, 2020, issued in European Patent Application No. 17 849 171.8.
Laplante, Sampling Rate & Sampling Frequency, Comprehensive Dictionary of Electrical Engineering—2nd Edition, XP 055841205, Jan. 2005.
European Office Action dated Sep. 24, 2021 issued in European Patent Application No. 17 849 171.8.

* cited by examiner (a)

(b)

(a)

(b)

(a)

(b)

(a)

(b)

ERP
(a)

SERP
(b)

Original SERP y-axis sampling rate adjusted

ERP (a)

↓ Tiling (b)

BOUNDARIES WHERE BLOCKING
ARTIFACT OCCURS IN 8 TILES

BLOCKING ARTIFACT TILE UNITS IN 8 TILES

BOUNDARIES WHERE BLOCKING ARTIFACT OCCURS IN 8 TILES

IMAGE PROCESSING METHOD AND DEVICE FOR PROJECTING IMAGE OF VIRTUAL REALITY CONTENT

CROSS-REFERENCE TO RELATED APPLICATION(S)

This application is a National Phase Entry of PCT International Application No. PCT/KR2017/009994, which was filed on Sep. 12, 2017, and claims priority to Korean Patent Application No. 10-2016-0117000, which was filed on Sep. 12, 2016, the contents of which are incorporated herein by reference.

BACKGROUND

1. Field

The present invention relates to image processing methods and devices, and in particular, to image processing methods and devices of virtual reality (VR) content.

2. Description of the Related Art

The Internet is evolving from the human-centered connection network, by which humans create and consume information, to the Internet of Things (IoT) network, by which information is communicated and processed between things or other distributed components. Internet of Everything (IoE) technology may be an example of a combination of Big data processing technology and IoT technology through, e.g., a connection with a cloud server.

To implement the IoT, technology elements, such as sensing technology, wired/wireless communication and network infra, service interface technology, and security technology are required. There is recent ongoing research for inter-object connection technologies, such as sensor networks, Machine-to-Machine (M2M), or the Machine-Type Communication (MTC).

Intelligent Internet Technology (IT) services, which may be offered in the IoT environment, may collect and analyze data generated by the things connected with one another in order to create new value for human life. The IoT may have various applications, such as smart homes, smart buildings, smart cities, smart cars or connected cars, smart grids, health-care, or smart appliance industry, or state-of-art medical services, through the conversion or integration of existing IT technologies and various industries.

As customer media content evolves from black-and-white content to color content, and high definition (HD), ultra high definition (UHD), and recent high dynamic range (HDR) content are standardized and spread, research is underway for virtual reality (VR) content that may be played using VR apparatuses, such as the Oculus or Samsung Gear VR.

The features of VR content are quite different from those of existing 2D content or 3D content. VR content may deliver truly immersive, 360-degree experiences to viewers or users. However, capturing, encoding, and transmitting 360-degree VR image content can encounter a myriad of challenges without implementing a post-high efficiency video coding (HEVC) codec that may be designed specifically for 3D, 360-degree content. 360-degree VR images may be provided in the form of still images or videos.

The VR system monitors a user and allows the user to enter feedback through a content display device or processing unit using a certain type of controller. The device or unit processes the entered feedback to adjust the content to fit the same, enabling interactions between user and device.

A VR echo system may largely be divided into the following basic components:

Display hardware [head mounted display [HMD], wireless, mobile VR, TVs, CA, cave automatic virtual environments (CA VEs)]

Peripheral devices and haptics [other controllers to provide inputs to VR]

Content capturing [cameras, video stitching]

Content studio [games, live, movies, news, and documentaries]

Industrial applications [education, health-care, real property, construction, trip]

Productivity tools and services [3D engine, processing power]

App store [for VR media content]

360-degree VR image processing may be achieved, e.g., by projecting 360-degree VR image content captured in spherical format to a planar image that may be encoded using a conventional codec(s), e.g., HEVC. The encoded content, after being received, is again projected in the spherical format supported by playback devices, and the projected image is provided to the user. As used herein, an image may be appreciated as encompassing still images or videos.

Since the concept of panorama and 360-degree images was proposed, image projection recently made available is equirectangular projection (ERP). The wide use of the ERP has contributed to its convenience to project spherical 360-degree images to a plane, rectangular image. However, the ERP suffers from a few downsides, such as the presence of unnecessary data at the top and bottom of ERP image representing the north pole and south pole in the entire row of pixels. Further, the ERP cannot support the mapping projection based on regions customized by the user's needs relying on specific requirements for content (e.g., the region of interest or more critical specified regions than the other regions in the 360-degree image content). Thus, a need exists for a scheme for efficiently projecting VR content images, such as 360-degree image content.

SUMMARY

According to the present invention, there is provided an efficient image processing method and device for VR content.

According to the present invention, there is provided an efficient image processing method and device for VR content which may reduce unnecessary data.

According to the present invention, there is provided an efficient image processing method and device for VR content which may differentiate regions.

According to an embodiment of the present invention, an image processing method for projecting an image of virtual reality content comprises obtaining a first planar image projected by dividing a spherical image for expressing a 360-degree image into a front part and a back part, generating a second planar image projected by sampling the first planar image based on a pixel position, and encoding the second planar image.

According to an embodiment of the present invention, an image processing device for projecting an image of virtual reality content comprises an encoder configured to encode image data and a controller configured to obtain a first planar image projected by dividing a spherical image for expressing a 360-degree image into a front part and a back part, and to generate a second planar image projected by sampling the first planar image based on a pixel position.

DETAILED DESCRIPTION

Figure 1:
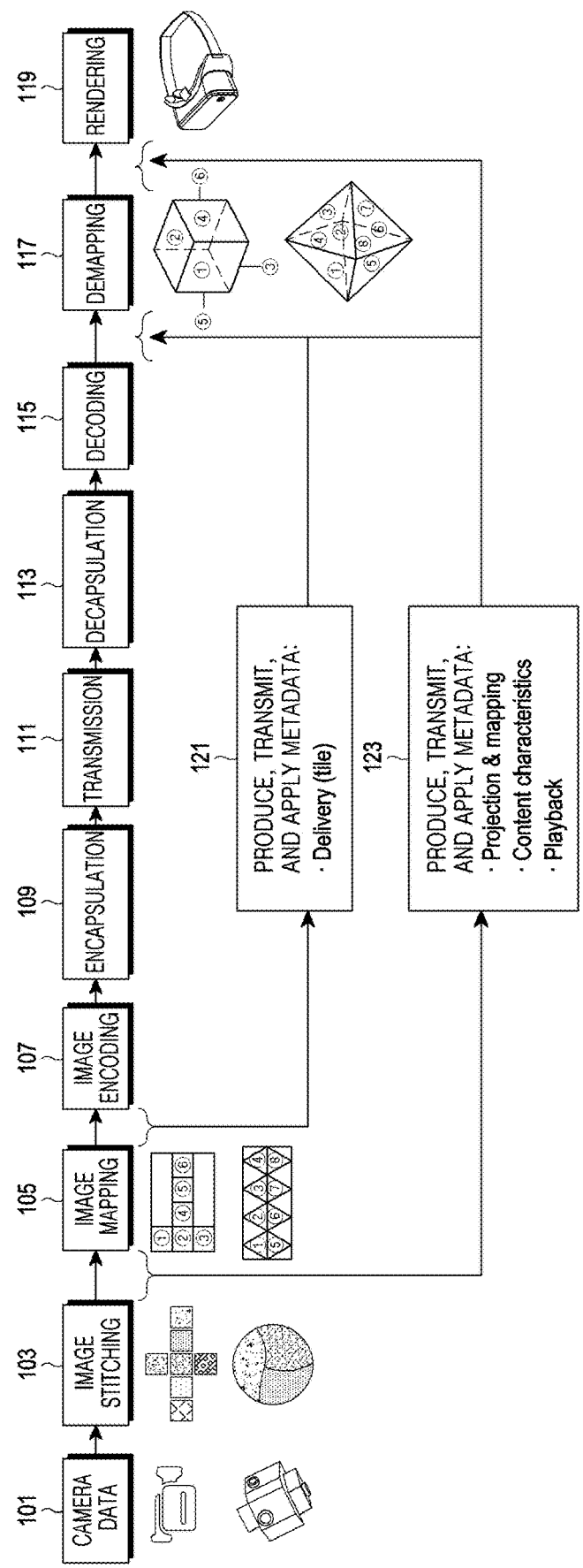
FIG. 1 is a view illustrating an example configuration of an image processing system to process media data of image content according to an embodiment of the present invention.

When determined to make the subject matter of the present invention unclear, the detailed description of known functions or configurations may be skipped.

Hereinafter, various embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. In some contexts, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory (storage unit) device or a dedicated processor (e.g., an embedded processor) for performing the operations.

According to various embodiments of the disclosure, an electronic device capable of performing an image process to project VR content images (hereinafter, simply referred to as an electronic device) may be included in at least one of, e.g., head-mounted devices (HMDs), various VR devices, game players, TVs, smartphones, tablet PCs, mobile phones, video phones, electronic paper readers, desktop PCs, laptop PCs, netbook computers, workstations, servers, medical devices, cameras, or wearable devices. The wearable device may be included in at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may be included in at least one of, e.g., a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame.

According to other embodiments, the electronic device may be included in at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to some embodiments, the electronic device may be included in at least one of part of a piece of furniture, building/structure or vehicle, an electronic board, an electronic signature receiving device, a projector, or various measurement devices (e.g., devices for measuring water, electricity, gas, or electromagnetic waves). According to various embodiments, the electronic device may be flexible or may be a combination of two or more of various electronic devices described above.

According to embodiments of the disclosure, the electronic device is not limited to the above-listed embodiments. As used herein, the term "user" may denote a human or another device using the electronic device.

The terms as used herein are defined as follows. Image may be a video or still image. Image content may include various multimedia content including an audio or subtitle, but not alone a video or still image. VR content includes image content that provides an image as a 360-degree image or three-dimensional (3D) image. Media file format may be a media file format that follows various media-related standards, such as an international organization for standardization (ISO)-based media file format (ISOBMFF). Projection means a process for projecting a spherical image for representing, e.g., a 360-degree image to a planar surface or an image frame obtained as per a result of the process. Mapping means a process for mapping image data on the planar surface by projection to a two-dimensional (2D) plane surface or an image frame obtained as per a result of the process. Omnidirectional media includes an image or video that may be rendered as per the user's viewport or the direction in which the user's head moves, e.g., when the user uses an HMD and/or its related audio. The viewport may be denoted field of view (FOV), meaning an area of an image viewed by the user at a certain view point (here, the area of image may be the area of the spherical image). Media data may be appreciated as data of the omnidirectional media or various multimedia data such as the image included in VR content.

FIG. 1 is a view illustrating an example configuration of an image processing system to process media data of image content according to an embodiment of the present invention.

Referring to FIG. 1, in an image processing system, a transmitting device includes an image stitching unit 103, an image mapping unit 105, an image encoding unit 107, and an encapsulation unit 109. A receiving device may include a decapsulation unit 113, an image decoding unit 115, an image demapping unit 117, and a rendering unit 119. The transmitting device includes a transmitter (not shown) for transmitting media data through a network, and the receiving device includes a receiver (not shown) for receiving the media data through the network. The transmitting device and the receiving device, respectively, may be referred to as an electronic device for transmitting VR content and an electronic device for receiving VR content.

The image processing system of FIG. 1 may process the omnidirectional media as an example of media data. The omnidirectional media may be appreciated as media data used in omnidirectional media applications for VR content services.

The image processing operation by the transmitting device in the system of FIG. 1 is described. The image stitching unit 103 receiving media data containing camera raw data 101 recorded (captured) by multiple cameras stitches the images entered through the multiple cameras as per a predetermined scheme. The stitched image may be, e.g., a 360-degree, spherical image. The image mapping unit 105 maps the spherical image to a planar image. In the mapping process, the spherical image may be projected to the planar image according to various projecting schemes proposed according to embodiments of the present invention. In other embodiments, the projection process may be performed on the output of the image mapping unit 105, and a separate image processing block may be configured to input the resulting image of the projection to the image encoding unit 107. Various projecting schemes according to the present invention are described below in detail. The image encoding unit 107 encodes the mapped media data as per various encoding schemes known in the image processing art. The encapsulation unit 109 encapsulates the encoded media data in a predetermined file format. The predetermined file format may be, e.g., an ISO-based media file format (ISOBMFF). The encapsulation unit 109 may be appreciated as a file generator to generate an ISO-based media file format. The ISO-based media file format contains video data and audio data or may contain metadata for rendering (or reproducing) the media data. The metadata may contain information related to the mapping as per the projecting scheme (121, 123). The file formats available for the present invention are not limited to the ISOBMFF, and as the file format, various file formats are available to transmit media data. The encapsulated media data is transmitted to the transmitter via the network (111). At least one of the image stitching unit 103, the image mapping unit 105, the image encoding unit 107, and the encapsulation unit 109 of the transmitting device may be implemented through at least one controller (or processor) to execute the program for performing the operation.

The image processing operation by the receiving device in the system of FIG. 1 is described. The receiving device receives the encapsulated media data through a receiver (not shown). The decapsulation unit 113 decapsulates the encapsulated media data as per a predetermined file format and extracts the encoded media data. The image decoding unit 115 decodes the encoded media data as per a predetermined decoding scheme. The image demapping unit 117 demaps the planar image mapped as per the projecting scheme applied in the transmitting device to the spherical image. The rendering unit 119 renders the demapped spherical image, allowing the same to be played on an electronic device, e.g., HMD. The metadata may be used to process at least one of the decoding, demapping, and rendering. The metadata may provide control information about the projecting scheme and mapping scheme applied and may provide control information for playing the image of the corresponding viewport as per the user's head motion on the electronic device, e.g., HMD. At least one of the decapsulation units 113, the image decoding unit 115, the image demapping unit 117, and the rendering unit 119 of the receiving device may be implemented through at least one controller (or processor) to execute the program for performing the operation. The receiving device may include a display unit (e.g., LED/LCD panel) to display the image being played. For example, when such an electronic device as an HMD is used, the receiving device may be implemented to include a detecting device for detecting the user's head motion.

Described below are various image projecting schemes for projecting a spherical image to a planar image as proposed according to embodiments of the present invention.

Figure 2:
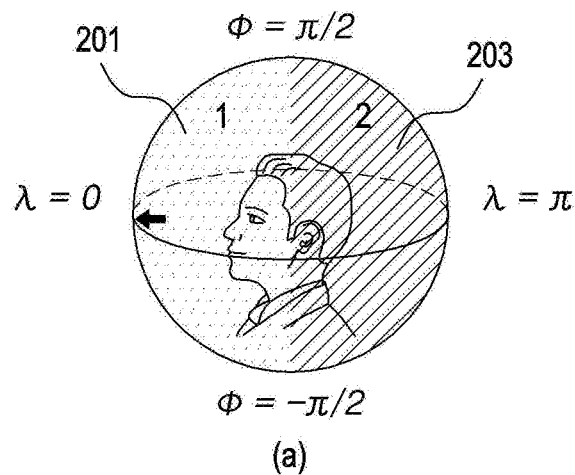
FIG. 2 is a view illustrating an image projecting scheme for VR content according to a first embodiment of the present invention.
Figure 2:
Figure 2:
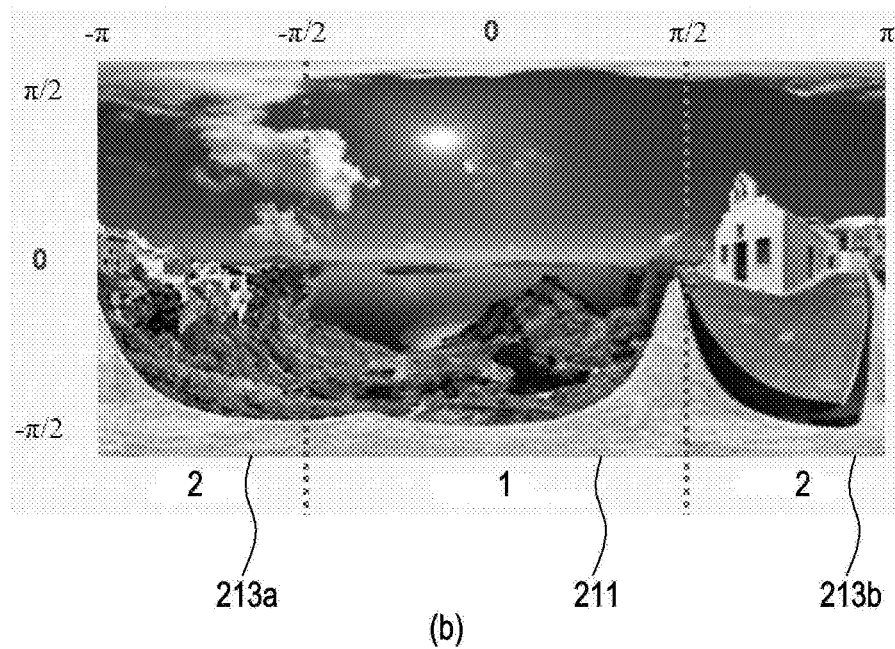

FIG. 2 is a view illustrating an image projecting scheme for VR content according to a first embodiment of the present invention.

FIG. 2(a) illustrates an example of a spherical image, such as a 3D 360-degree image, and FIG. 2(b) illustrates an example of projecting the spherical image to an equirectangular planar image. As shown in FIG. 2(a), the spherical image is divided into two regions, such as a front region1 201 and a back region2 201. In FIG. 2(a), the angles λ and φ refer to the longitude and latitude, respectively, in the spherical image. The angles λ and φ mean the longitude and latitude, respectively, in the spherical coordinate system representing the planar image, and this definition may remain the same through the description of the following embodiments and the drawings. By squared equirectangular projection, the spherical image is transformed into an equirectangular planar image as shown in FIG. 2(b), wherein the region corresponding to region1 201 is reference number 211, and the regions corresponding to region2 203 are reference numbers 213a and 213b in FIG. 2(b). The equirectangular planar image of FIG. 2(b) is encoded and transmitted to the receiving device. To display to the user, the receiving device transforms the equirectangular planar image into the spherical image of FIG. 2(a) by performing inverse projection on the equirectangular planar image. Various research efforts are recently underway for 360-degree image projection using geographical mapping, e.g., cube, cylinder, or pyramid-shape mapping. The geographical mapping, before defining specific projections for regions of different surfaces of the geographical shape, defines the geographical mapping of, e.g., cube or cylinder and then unfolds the geographically mapped image into the planar image for encoding. The projecting schemes proposed according to embodiments of the present invention are based on pseudocylindrical projections and thus do not need to define the geographical mapping as conventional projection schemes do. In embodiments of the present invention, polar coordinates specifying a 360-degree image may be projected to a 2D planar image, and such a projection scheme reduces unnecessary data and enables region-based projections. The pseudocylindrical projections include, e.g., sinusoidal projection, and feature 1) to 4) as follows:

1) reduce unnecessary data in poles (the north pole and south pole in the coordinate system) after projection;

2) are specific region-based projections relying on a region(s) of interest in content; and 3) enable simplified reorganization and packing of regions projected on 2D planar image for encoding.

Figure 3A:
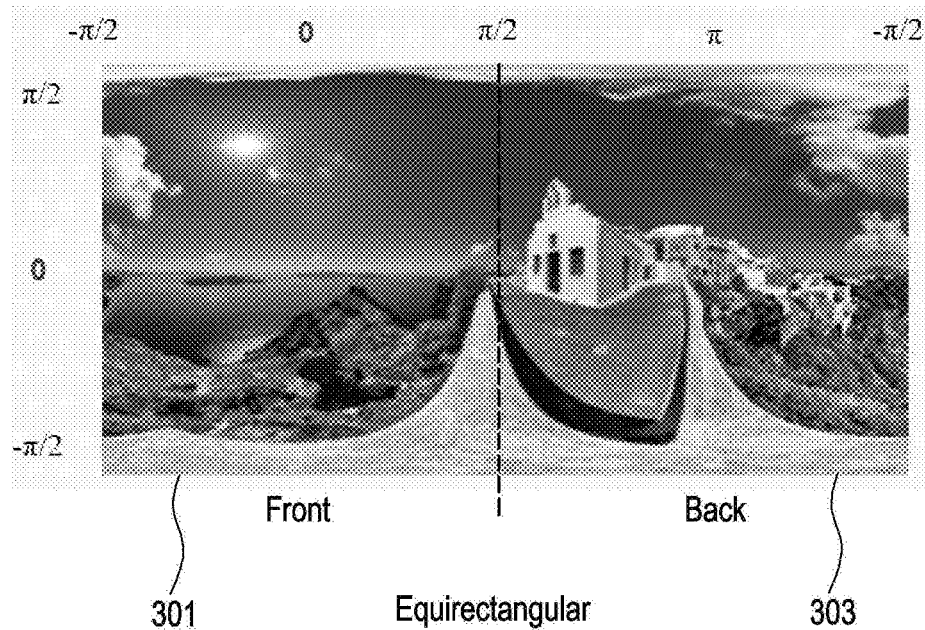
FIGS. 3 to 6d are views illustrating an image projecting scheme for VR content according to a second embodiment of the present invention.
Figure 3B:
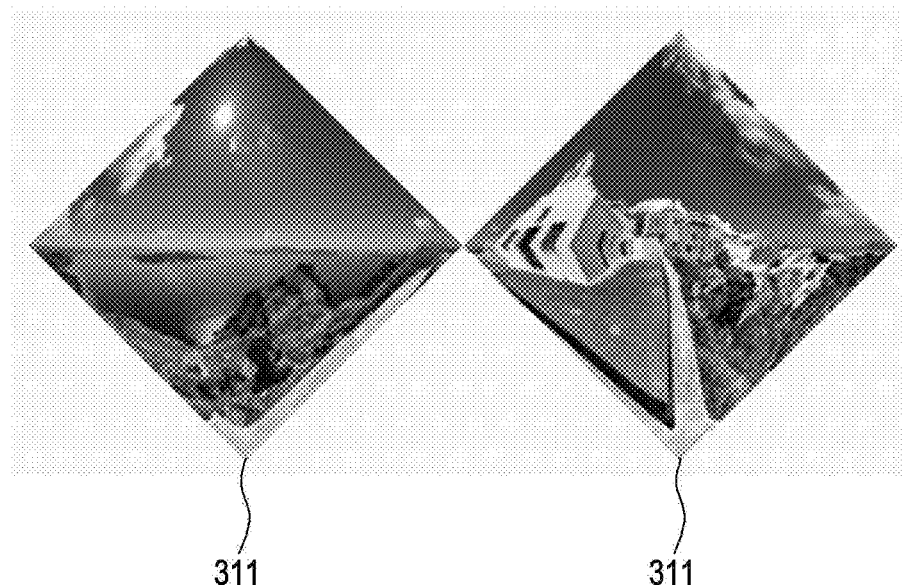

FIG. 3 is a view illustrating an image projecting scheme for VR content according to a second embodiment of the present invention.

FIG. 3($a$) illustrates an example of an equirectangular image (hereinafter, equirectangular projection (ERP) image) projected from the spherical image, and FIG. 3($b$) illustrates an example of a squared equirectangular image (hereinafter, a squared equirectangular projection (SERP) image) transformed from the ERP image. In the example of FIG. 3, the ERP image is divided into a front region 301 and a back region 303 as projected from the spherical image. The front region refers to the region with a longitude λ range [−π/2, π/2], and the back region refers to the region with a longitude λ range [π/2, π] or [−π, −π/2]. The front region 301 of the ERP image is transformed into a first region 311 of the SERP image, and the back region 303 of the ERP image is transformed into a second region 313 of the SERP image. Image transformation is carried out in such a manner that coming close to the top or bottom pole in the first and second regions 311 and 313 reduces the number of pixels of the image, and coming close to the equator increases the number of pixels of the image. The pole means the north pole (latitude φ=π/2) or the south pole (latitude φ=π/2), and the equator means where φ=0. The number of pixels in the equator is assumed to be the same as the number of pixels in a row of the ERP image. The application of image projection in the SERP scheme may reduce the sampling rate of the image by about 50% compared to the ERP scheme. Compared to images in the ERP scheme, images in the SERP scheme present a sampling rate close to 100% in their equator and a sampling rate close to 0% in their poles, with the result of an overall sampling rate of 50%. The above-mentioned specific numbers of sampling rate are provided for a better understanding, but should not be intended as limiting the scope of the disclosure. Upon transforming a spherical image into an ERP image, the equator shows no or little variation in data, but the poles may show an increase in data. This issue may cause inefficiency in image processing. The use of images in the SERP scheme may address such issue. The disclosure focuses primarily on mutual transformation between images in the ERP scheme and images in the SERP, but the present invention is not limited thereto. As described below, SSP images, instead of SERP images, may be put to use. According to the disclosure, spherical images may be transformed into SERP images, and vice versa. It is apparent to create an SERP image from an image resulting from mapping a spherical image to a specific polygon (e.g., tetrahedron, hexahedron, octahedron, dodecahedron, or icosahedron) using mapping between an ERP image and an SERP image.

Figure 4A:
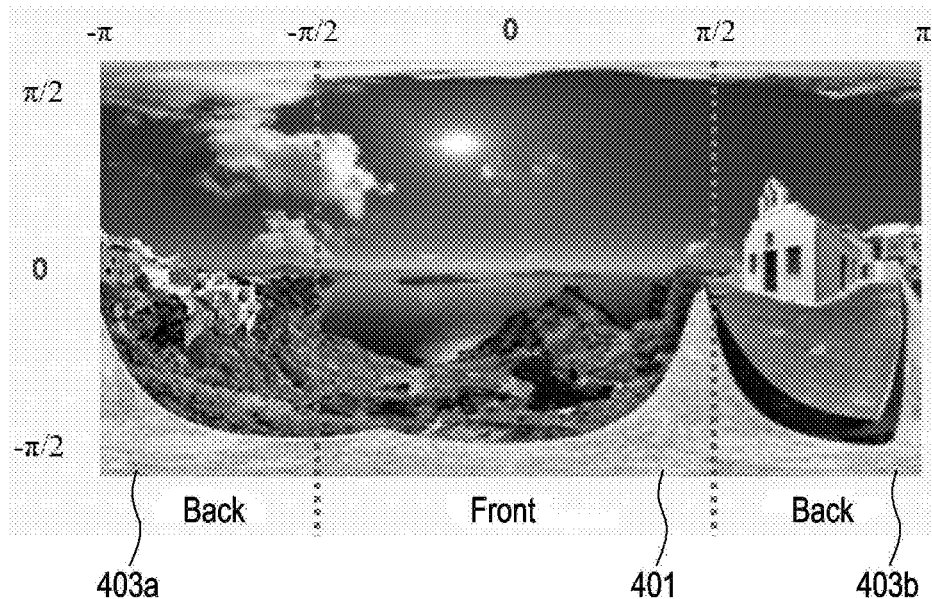
Figure 4B:
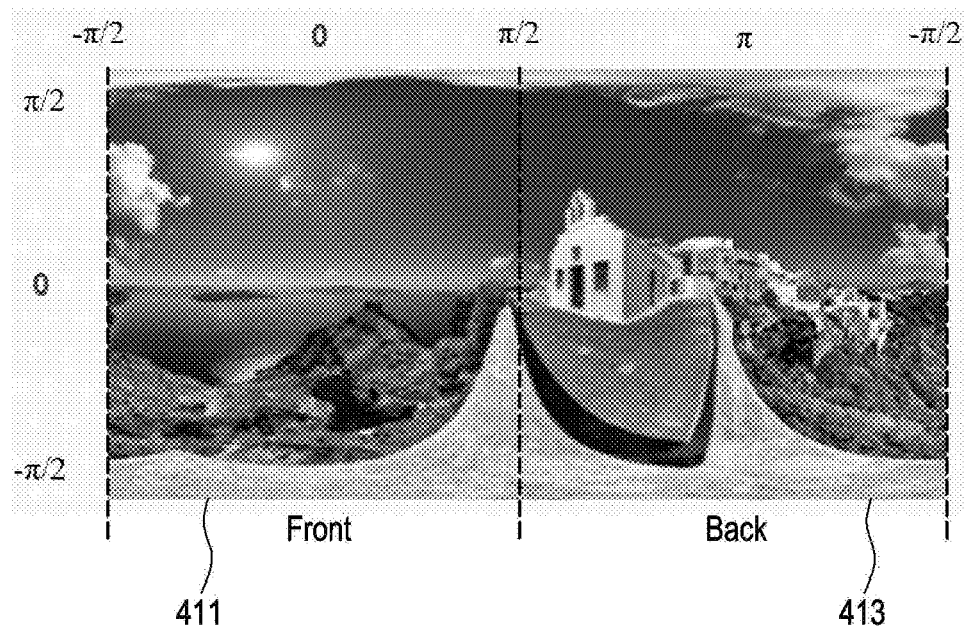

FIG. 4 is a view illustrating an image projecting scheme for VR content according to the second embodiment of the present invention. (a) and (b) of FIG. 4 show different configurations of ERP images projected from a spherical image. FIG. 4($a$) illustrates an example in which a front part of the spherical image is projected to one front region 401, and a back part of the spherical image is projected to multiple sub regions, e.g., back regions 403$a$ and 403$b$. FIG. 4($b$) illustrates an example in which the front part of the spherical image is projected to one front region 411, and the back part of the spherical image is projected to one back region 413. The ERP images shown in FIGS. 4($a$) and ($b$) represent various projection examples. Each of the ERP images of FIGS. 4($a$) and ($b$) may be transformed into an SERP image as shown in FIG. 3.

Figure 5:
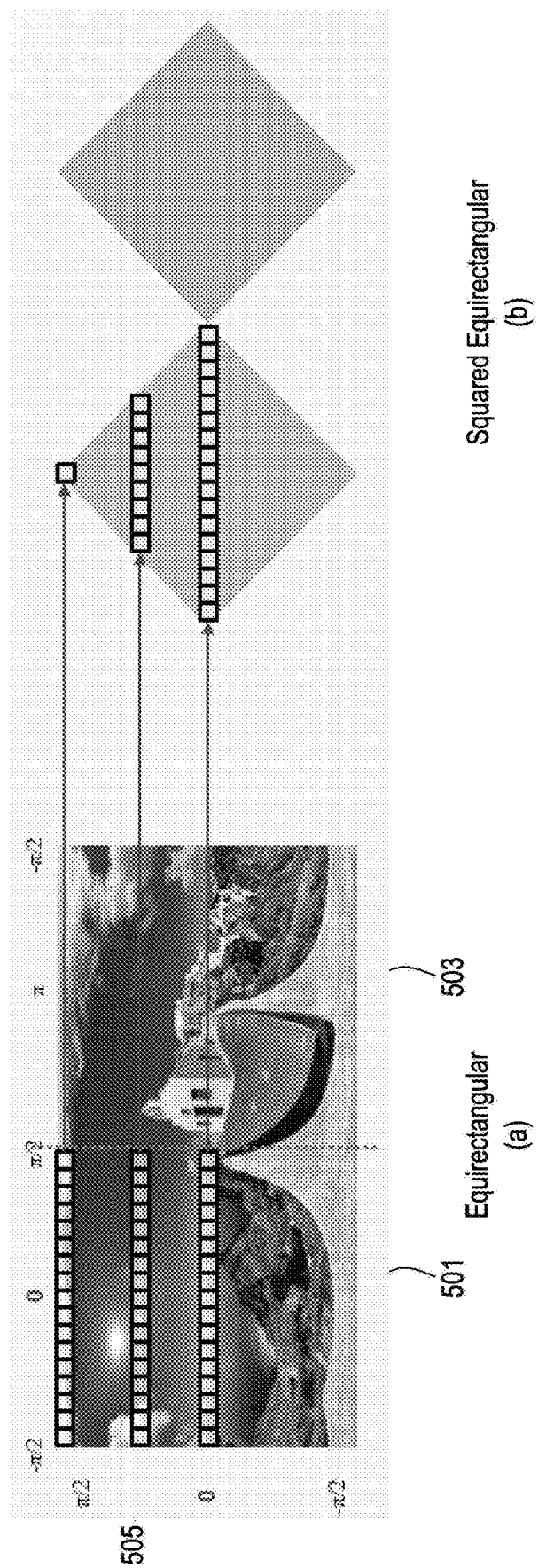

FIG. 5 is a view illustrating an image projection scheme for VR content according to the second embodiment of the present invention, i.e., the scheme of adjusting the sampling rate in an SERP image as described above in connection with the embodiment of FIG. 3.

FIG. 5($a$) illustrates an example of an ERP image in which a front part of a spherical image is projected to a front region 501, and a back part of the spherical image is projected to a back region 503. The ERP image has the same number of pixels allocated from the equator to the poles. That is, the sampling rate remains the same (505). FIG. 5($b$) illustrates an example of an SERP image transformed from the ERP image. Coming close to the top or bottom pole in the first and second regions 511 and 513 of the SERP image reduces the number of pixels of the image, and coming close to the equator increases the number of pixels of the image (515). That is, in the example shown in FIG. 5, the SERP image reduces in image sampling rate as coming close to the poles ("row-wise down sampling"). As such, an interpolation method for sampling the pixel data in the middle of the pixels may be used to adjust image sampling rate. As the interpolation method, well-known methods, e.g., nearest neighbor method, linear interpolation, cubic convolution, or B-splines method, may be adopted.

The coordinate conversion from the ERP image to the SERP image may be performed as per Equation 1 below.

$$\text{if} - \frac{\pi}{2} \le \lambda \le \frac{\pi}{2} \qquad \text{Equation 1}$$
$$x = \lambda \cdot \left(1 - 2\frac{|\phi|}{\pi}\right)$$
$$y = \phi$$

In Equation 1 above, the angles λ and φ, respectively, refer to the longitude and latitude in the spherical image. The longitude λ and the latitude φ, respectively, meet 0≤λ≤2π and −π/2≤φ≤π/2.

FIGS. 6$a$ to 6$d$ are views illustrating an image processing scheme for VR content according to the second embodiment of the present invention. (a) and (b) in FIGS. 6$a$ to 6$d$ show various example layouts of sub images (F1 to F4 and B1 to B4, where F is the front, and B is the back) arranged in each of four sub regions (regions differentiated in dashed lines) divided from each of a first region and a second region in the SERP image. The first and second regions shown in FIGS. 6$a$ and 6$c$ may be combined into a region as shown in FIG. 6$b$, in which case the compression ratio of the SERP image to be transmitted may be enhanced. As an example, in the first and second regions configured in a rhombus shape as shown in FIG. 6a, the empty regions (when it is assumed to be square) facing the sides of the rhombus may be filled with padding data (or null data).

Figure 6A:
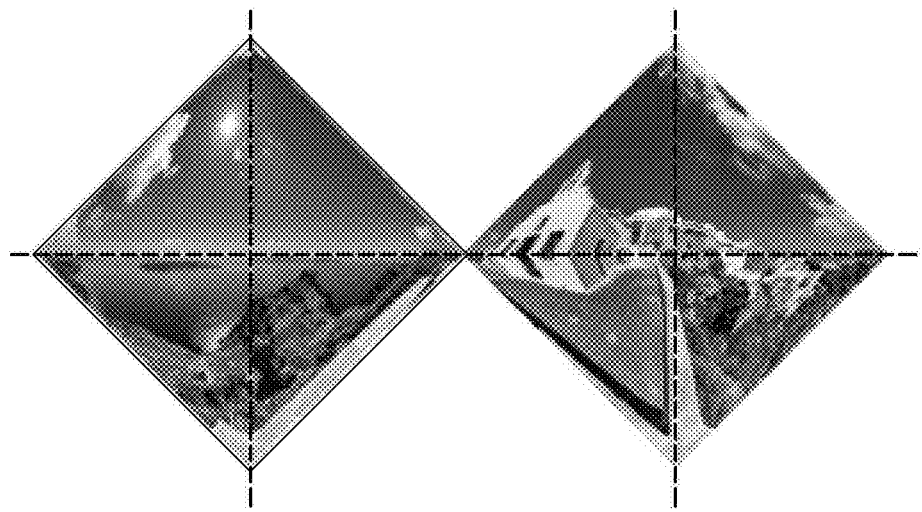
Figure 6A:
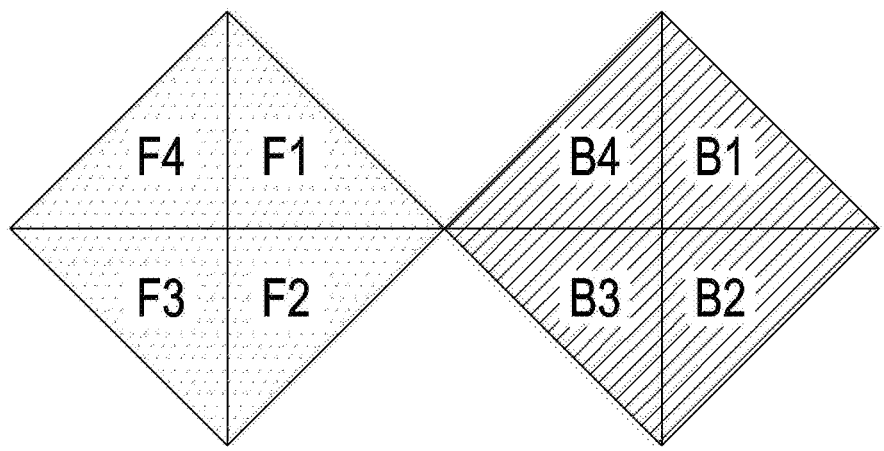
Figure 6B:
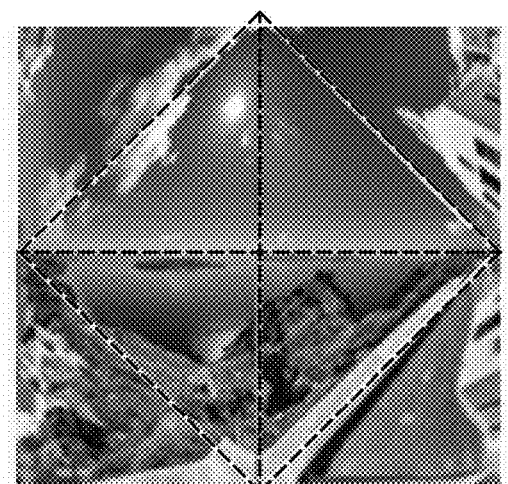
Figure 6B:
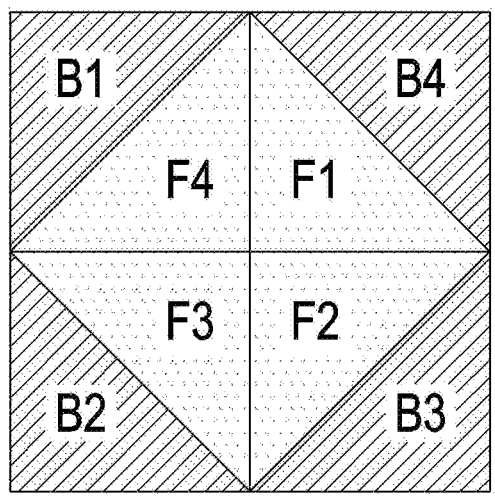
Figure 6C:
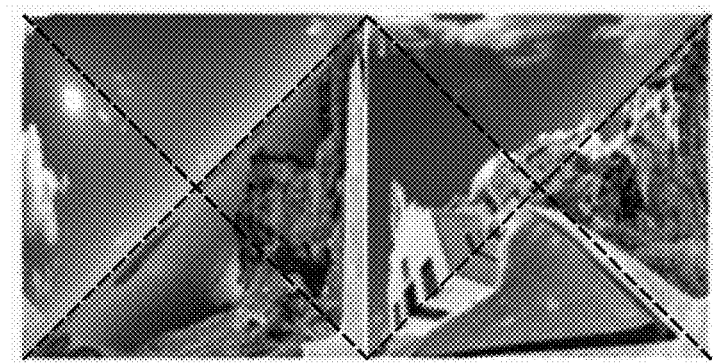
Figure 6C:
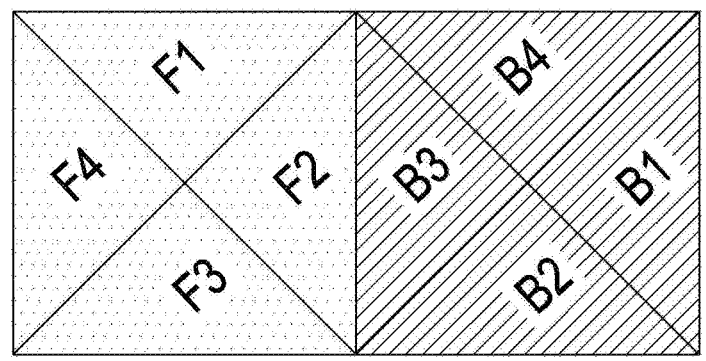
Figure 6D:
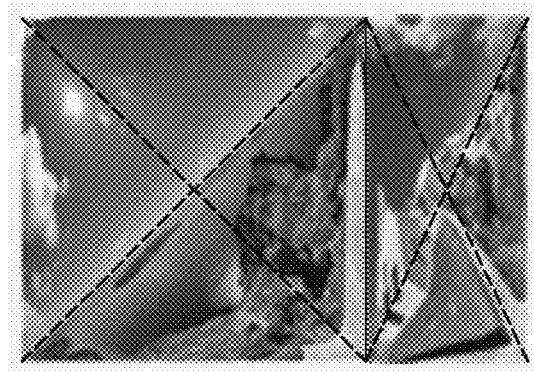
Figure 6D:
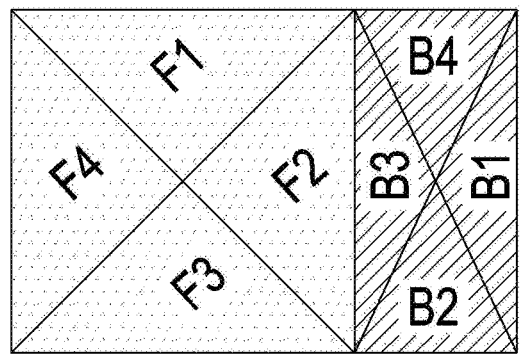
Figure 7A:
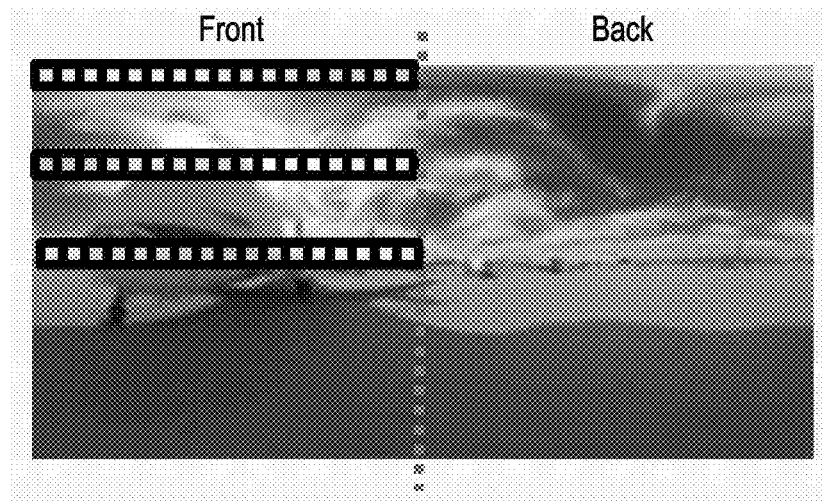
FIGS. 7 to 12 are views illustrating an image projecting scheme for VR content according to a third embodiment of the present invention.
Figure 7B:
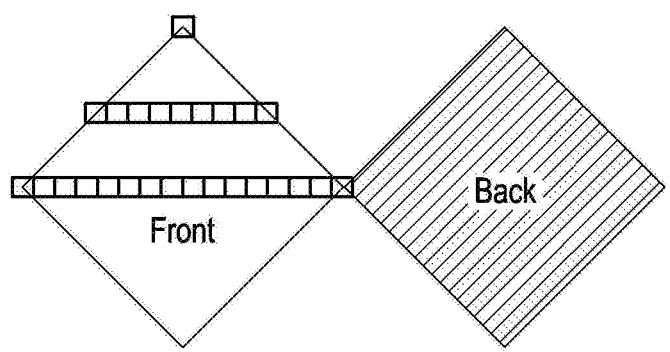
Figure 7C:
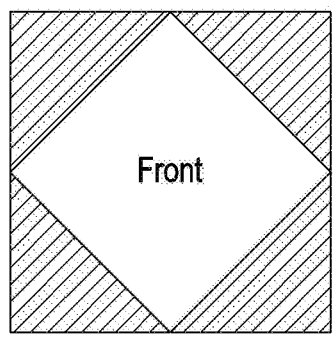
Figure 8:
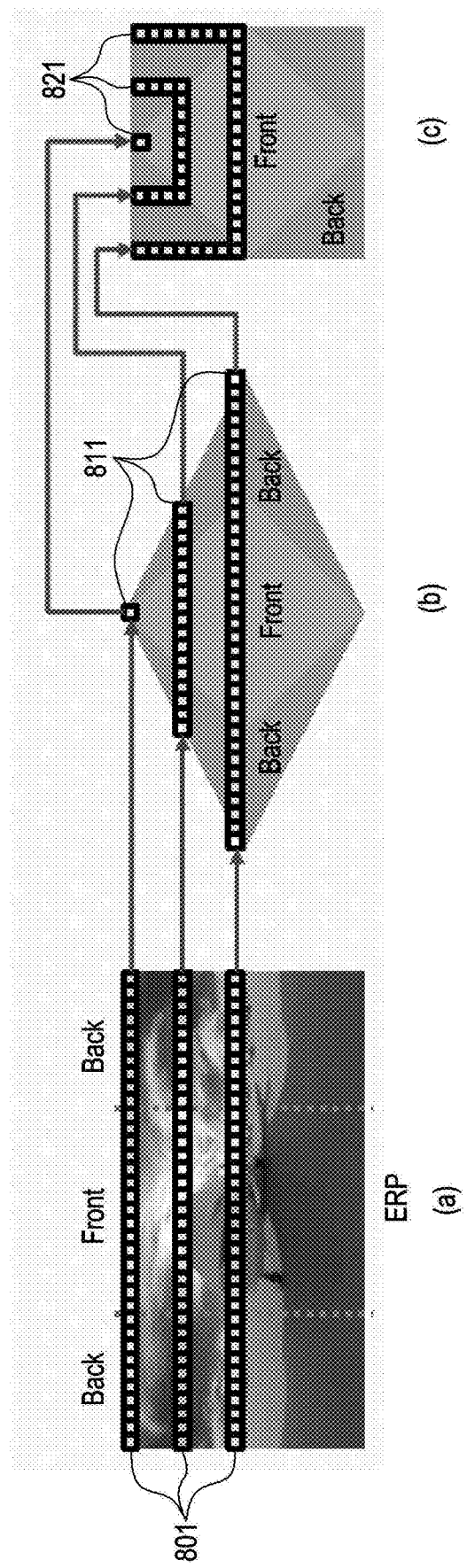

FIGS. 7 and 8 are views illustrating an image projecting scheme for VR content according to a third embodiment of the present invention. FIG. 8 illustrates a modification to the embodiment of FIG. 7. The third embodiment of the present invention is described based on the embodiment of FIG. 8.

and (b) of FIG. 7 illustrate the operation of transforming an ERP image into an SERP image as shown in FIGS. 5(a) and (b). FIG. 7(c) illustrates an example of reconfiguring the first and second regions of the SERP image into the combined region in one square as shown in FIG. 6b.

FIG. 8(a) illustrates an example in which as shown in FIG. 4(a), the front part of the spherical image is projected to one front region in the ERP image, and the back part of the spherical image is projected to the back region divided into multiple sub regions in the ERP image. FIG. 8(b) illustrates an example projecting scheme in which without transforming the ERP image of FIG. 8(a) into two rectangular regions as shown in FIG. 7(b), the ERP image is transformed into one rhombus-shaped image, and the rhombus-shaped image is again transformed into a square image as shown in FIG. 8(c). In FIG. 8(a), the image sampling rate remains the same (801), and in FIG. 8(b), the sampling rate is the same as in FIG. 8(a) and reduces as coming close to the poles (811). In FIG. 8(c), the sampling rate is adjusted according to the horseshoe-shaped pixel arrangement (821). The SERP image in which the pixel arrangement has been altered as shown in FIG. 8(c) may have its front part and back part joined together seamlessly along the boundary, and the sampling rate may be easy to adjust.

Figure 9:
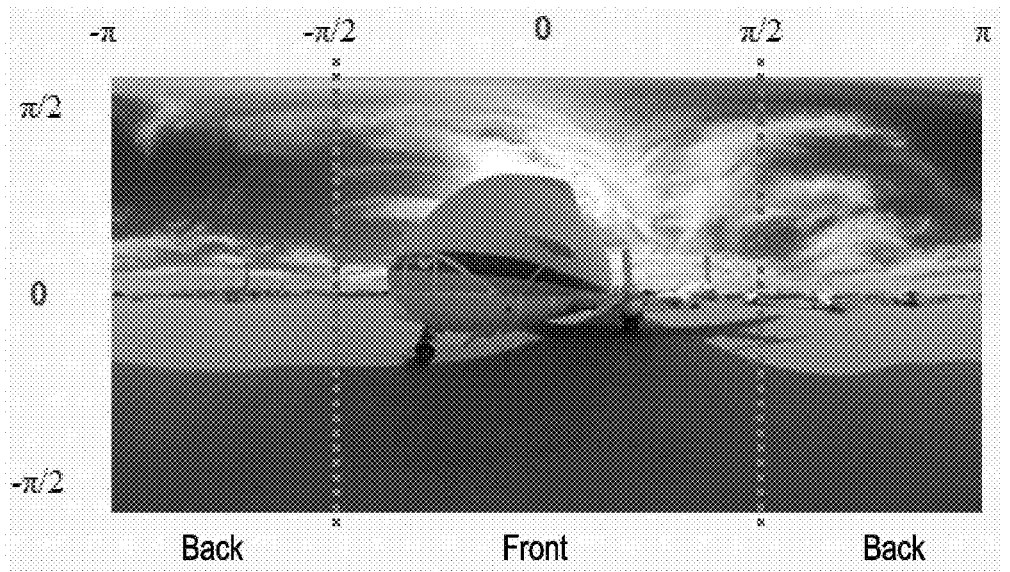
Figure 9:
Figure 9:
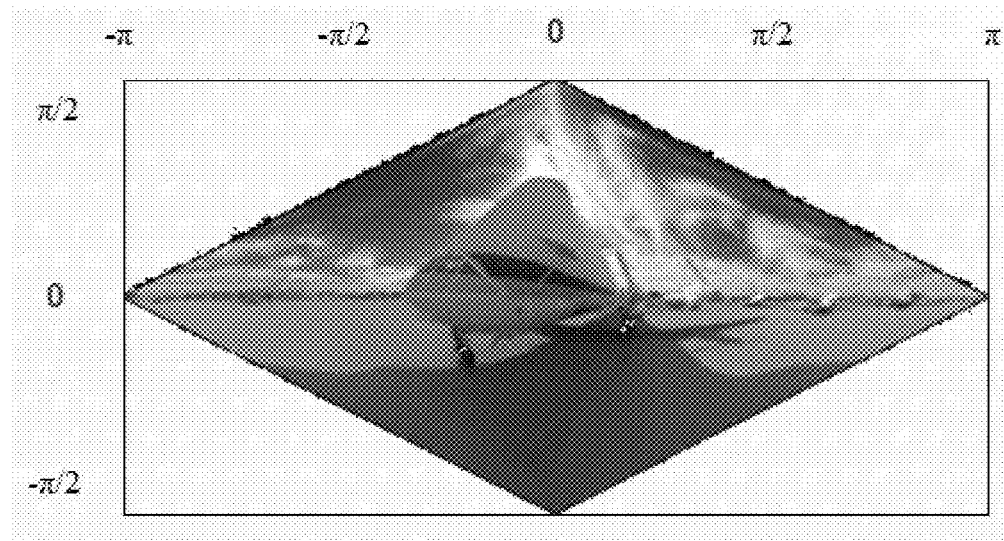

FIG. 9 is a view illustrating an image projection scheme for VR content according to the third embodiment of the present invention, i.e., the operation of transforming an ERP image into a rhombus image as shown in FIGS. 8(a) and (b).

That is, FIG. 9(a) illustrates an example in which the front part of the spherical image is projected to one front region in the ERP image, and the back part of the spherical image is projected to the back region divided into multiple sub regions in the ERP image. FIG. 9(b) illustrates an example of transforming the ERP image into a rhombus-shaped SERP image. The horizontal-vertical ratio of the rhombus shape may be set to n:1 (e.g., 2:1). The application of image projection in the SERP scheme as shown in FIG. 9(b) may reduce the image sampling rate by about 50% compared to the ERP scheme and maintain the same sampling rate in the equator as the ERP image.

Figure 10:
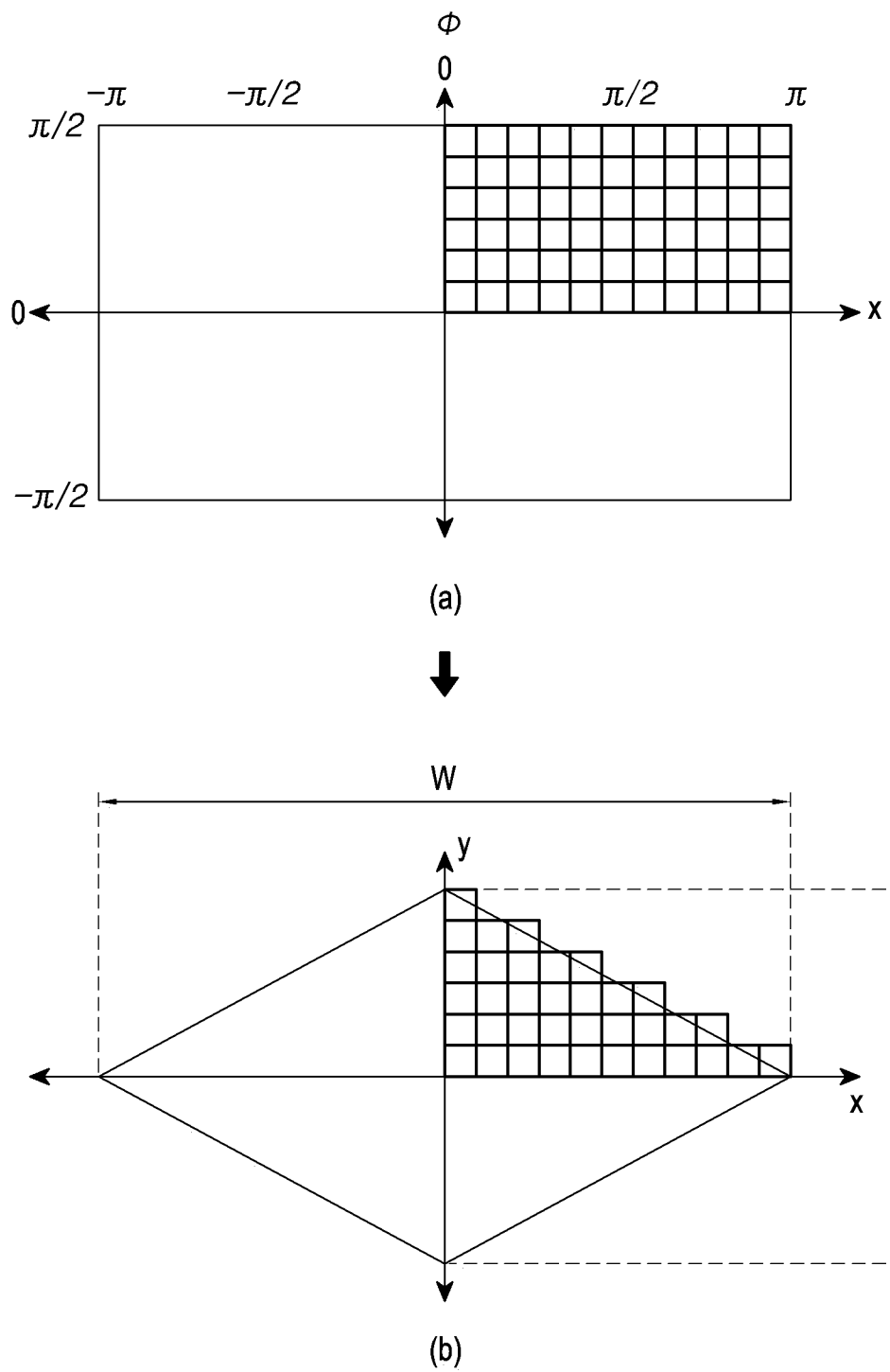

FIG. 10 is a view illustrating an image projection scheme for VR content according to the third embodiment of the present invention, i.e., an example coordinate conversion scheme from an ERP image into a rhombus-shaped SERP image as shown in FIGS. 8(a) and (b).

FIG. 10(a) illustrates the coordinates of the ERP image, and FIG. 10(b) illustrates the coordinates of the SERP image. The coordinate conversion from the ERP image to the SERP image may be performed as per Equation 2 below.

$$y = \frac{\phi}{\frac{\pi}{2}} \cdot \frac{H}{2}$$ Equation 2

$$x = \frac{\lambda}{\pi} \cdot \frac{W}{2} \cdot \left(1 - 2\frac{|y|}{H}\right)$$

In FIG. 10 and Equation 2, the angles λ and φ, respectively, refer to the longitude and latitude in the spherical image, and W and H, respectively, refer to the horizontal and vertical length of the SERP image.

Figure 11A:
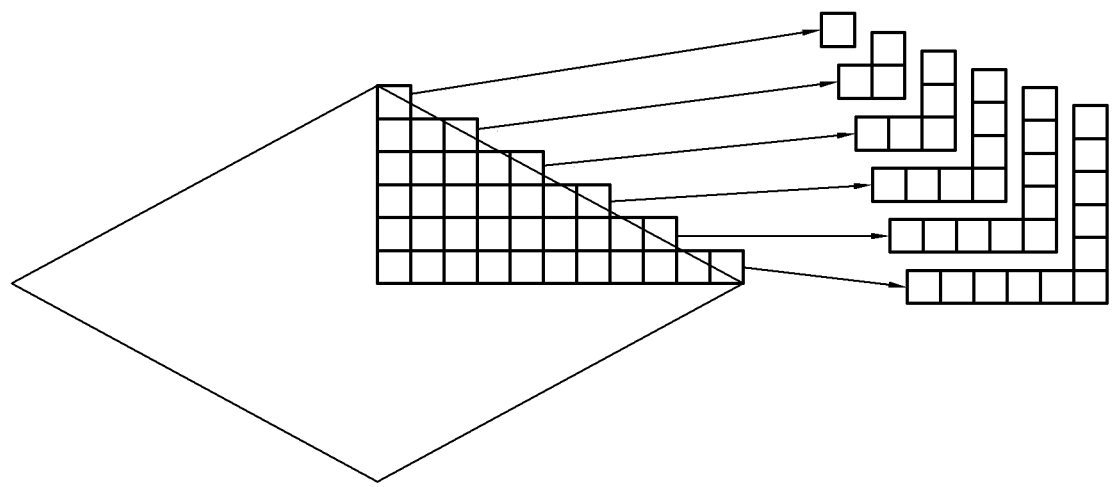
Figure 11B:
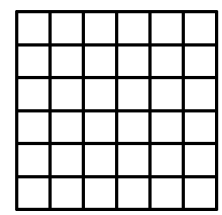

FIG. 11 is a view illustrating an image projecting scheme for VR content according to the third embodiment of the present invention, i.e., a projecting scheme for transforming the rhombus-shaped (format) SERP image as shown in FIG. 11(a) into a square-shaped (format) SERP image as shown in FIG. 11(b). By the projecting scheme as shown in FIG. 11, the image may effectively be processed with no empty region in the SERP image, and image compression may be done more efficiently.

FIG. 11 is a view illustrating an image projecting scheme for VR content according to the third embodiment of the present invention. According to the embodiment as shown in FIGS. 8 to 10, when a rhombus-shaped (format) SERP image is transformed into a square-shaped (format) SERP image, such an algorithm for adjusting the sampling rate in the x and y directions as represented in Equation 3 may be used.

$$y = S_y(\phi) \cdot \frac{H}{2}$$ Equation 3

$$x = S_x(\lambda) \cdot \frac{W}{2} \cdot \left(1 - 2\frac{|y|}{H}\right)$$

When the sampling rate in the equator increases, Equation 3 may be adjusted to meet $S_y(\phi)=\sin(\phi)$. As the functions for adjusting sampling rate as represented as $S_y(\ )$ and $S_x(\ )$, various known algorithms for sampling rate adjustment may be used.

Figure 12A:
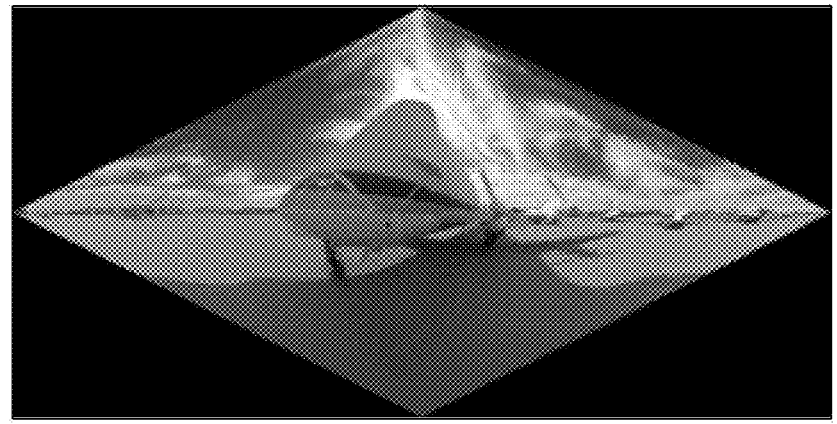
Figure 12B:
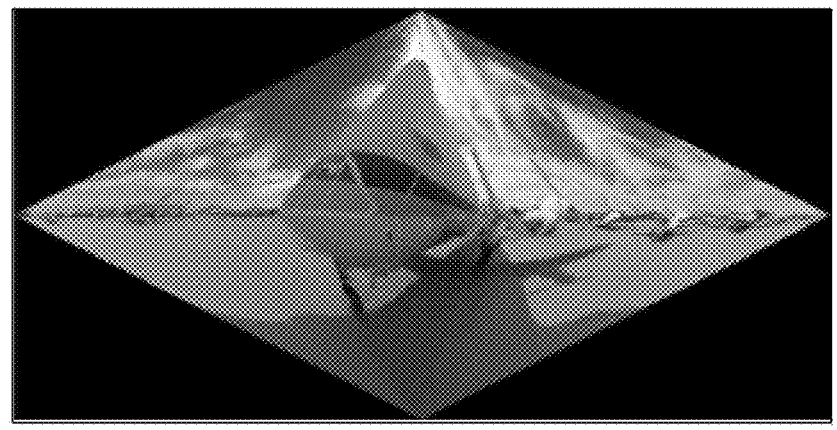

FIG. 12 is a view illustrating an image projecting scheme for VR content according to the third embodiment of the present invention. FIG. 12(a) illustrates an example of a rhombus-shaped SERP image. FIG. 12(b) illustrates an example in which the y-axis sampling rate is adjusted in the rhombus-shaped SERP image as per the sampling rate adjusted using Equation 3. In the case of FIG. 12(b), it can be shown that the sampling rate increases along the y axis. In this case, the sampling rate in the equator increases as well. As in the above-described embodiment, it is also possible to up-sample image data of a specific part in the SERP image.

Figure 13:
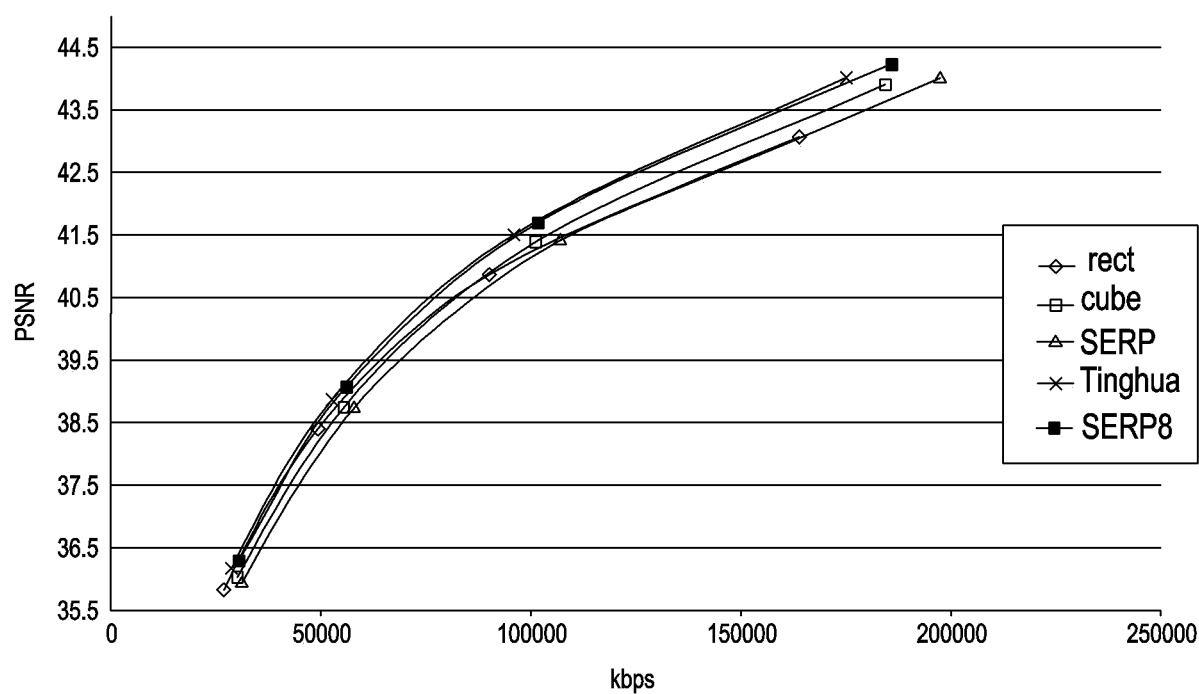
FIGS. 13 to 22 are views illustrating an image projecting scheme for VR content according to the third embodiment of the present invention.

FIG. 13 is a view illustrating an image projection scheme for VR content according to a fourth embodiment of the present invention, e.g., a comparison in performance with a tile-based (unit) SERP scheme.

In FIG. 13, rect, cube, and Tinghua are conventional image projecting schemes, and SERP and SERP8 are projecting schemes according to an embodiment of the present invention. SERP8 means, e.g., an 8 tile-based projecting scheme. In the graph of FIG. 13, the horizontal axis refers to the transmission rate, and the vertical axis refers to the peak signal-to-noise ratio (PSNR). FIG. 13 illustrates a comparison in performance related to compression efficiency between the projecting schemes. The conventional projecting schemes oftentimes cause a lowering in compression efficiency due to the overall projected image tilting, and this is why the bit rate increases when the projected image includes many vertical edge components. Given this, there is proposed a scheme for performing SERP in tile units to enhance compression efficiency according to an embodiment of the present invention.

FIGS. 14 to 18 are views illustrating an image projection scheme for VR content according to the fourth embodiment of the present invention, e.g., a tile-based (unit) SERP scheme.

Figure 14:
Figure 14:
Figure 15:
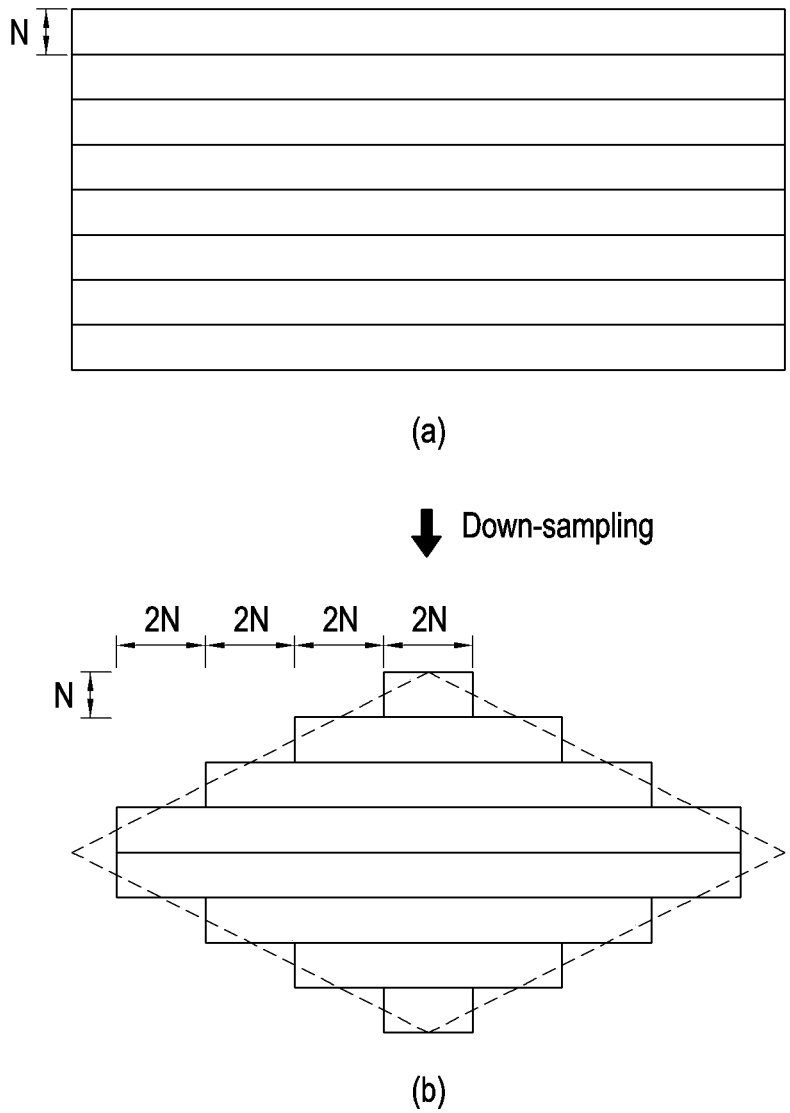
Figure 16:
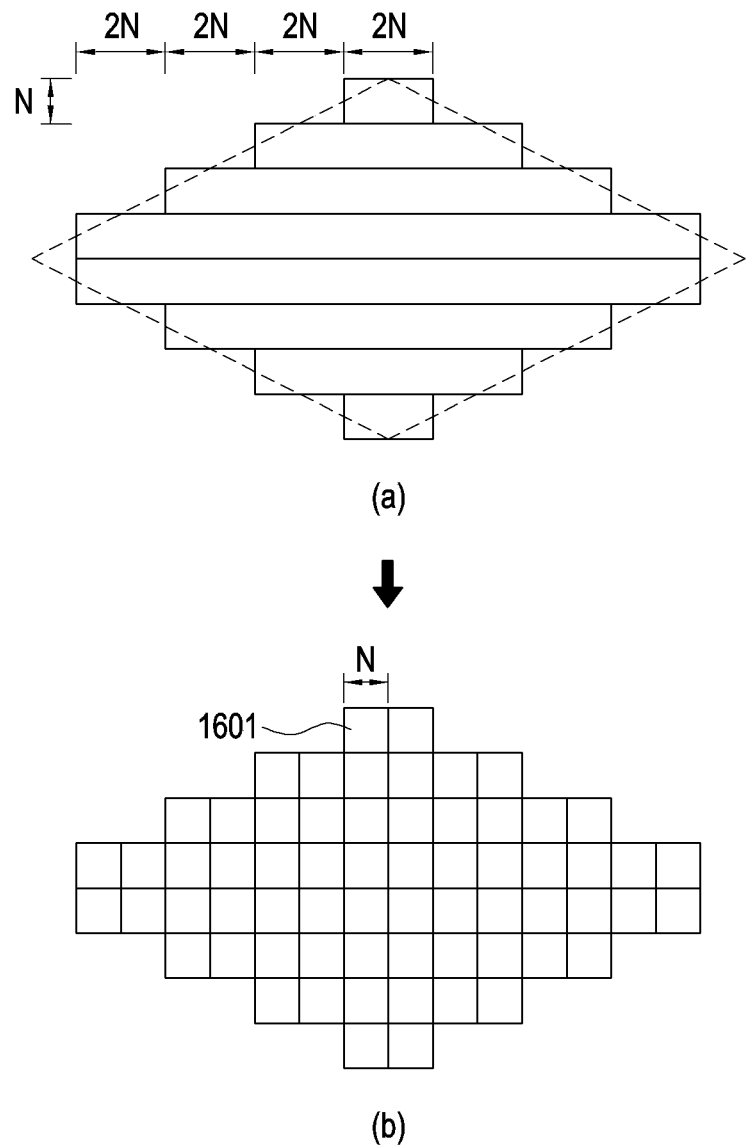
Figure 17:
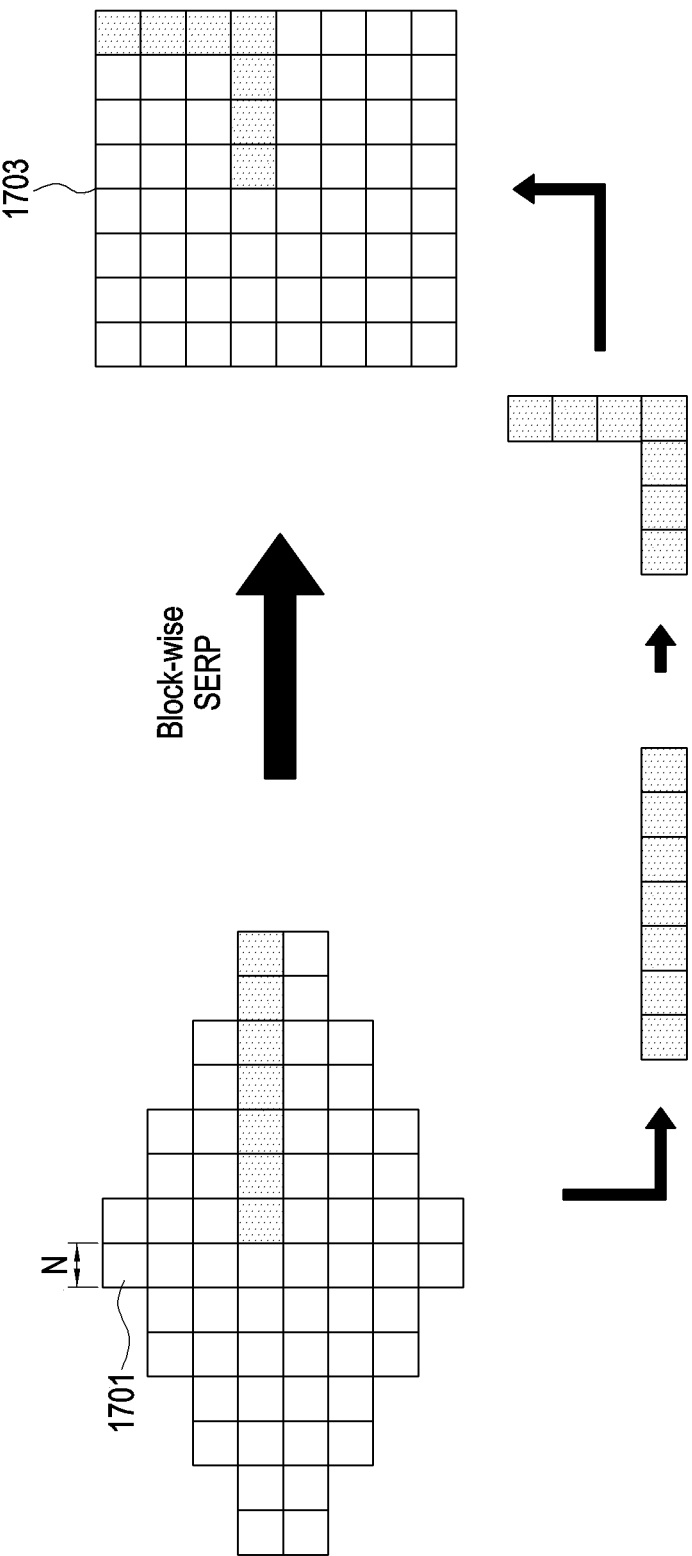
Figure 18:
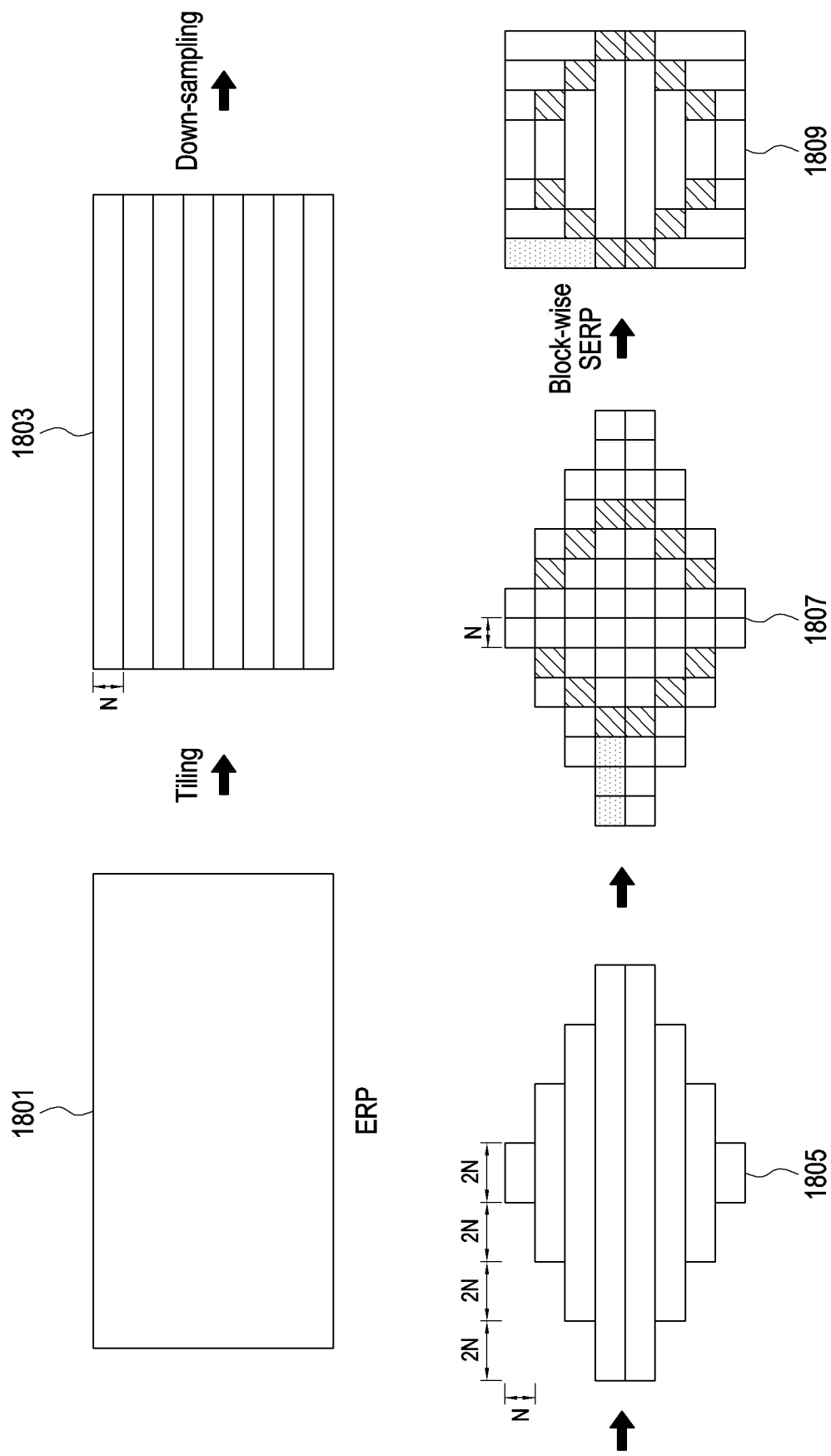
Figures 19A, 19B, 19C:
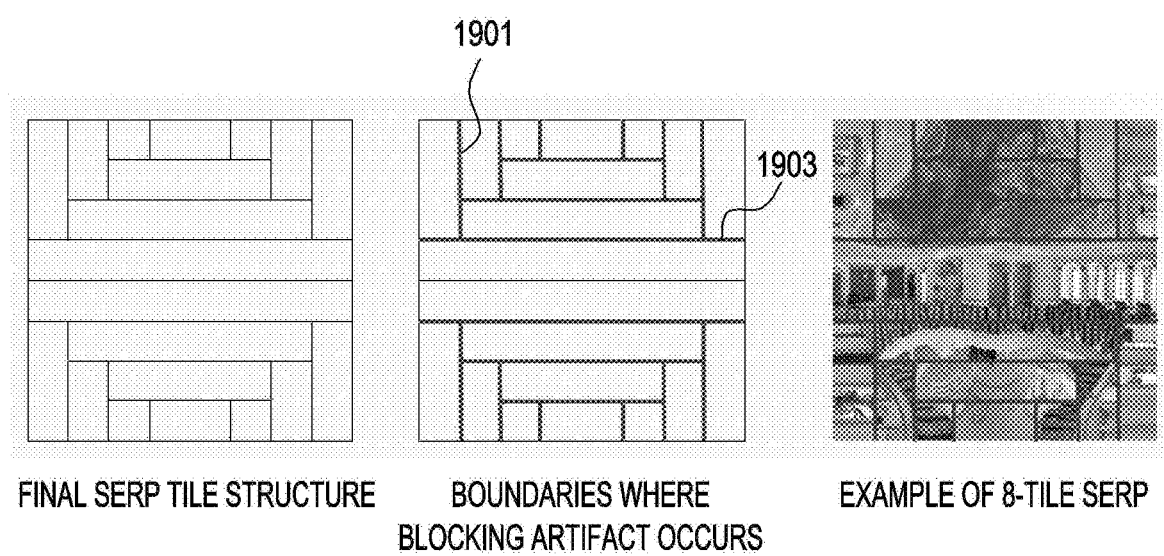

In the above-described embodiments, the SERP scheme transforms ERP images into rhombus-shaped SERP images as shown in FIG. 8(b) and down-samples them on a per-row basis. As shown in FIG. 8(c), the SERP scheme folds up each row of the SERP image in a horseshoe shape on the middle of the row, into a square shape. In the example shown in FIG. 14, the tile-based SERP scheme divides the ERP image of FIG. 14(a) into tile units 1401 as shown in FIG. 14(b). This is called pre-processing. In FIG. 14(b), reference denotation N is the height of each tile. Thereafter, as shown in FIG. 15, the ERP image of FIG. 15(a) is transformed into the rhombus-shaped SERP image of FIG. 15(b), with each tile regarded as each row of the SERP image. Then, each tile in the rhombus-shaped SERP image is divided into multiple, e.g., N*N, blocks 1601 as shown in FIGS. 16(a) and (b). As shown in FIG. 17, the rhombus-shaped SERP image is transformed into a square-shape SERP image 1703, with each block 1701 taken as a pixel. FIG. 18 sequentially illustrates the images transformed as per the tile-based SERP scheme in the order of: ERP image 1801=>ERP image 1803 divided into tile units=>rhombus-shaped SRP images 1805 and 1807=>square-shaped SERP image 1809.

FIGS. 19 to 22 are views illustrating an image projecting scheme for VR content according to the fourth embodiment of the present invention, e.g., blocking artifact, which is quality deterioration that may arise in the boundary of each tile after encoding SERP image in the tile-based SERP scheme. Generally, when a high compression rate applies while each block of an image is independently processed in image processing, incontinuity may occur in the boundary between blocks, causing quality deterioration. The above-described SERP image may also be subject to blocking artifact. FIG. 19(a) briefly illustrates a tile structure in a tile-based SERP image. FIG. 19(b) illustrates tile boundaries where blocking artifact may occur in think solid lines. FIG. 19(c) illustrates tile boundaries in the 8 tile-based SERP image from which it can be shown that incontinuity partially occurs in each tile boundary. However, it can be shown that no blocking artifact occurs in the equator (middle) of the SERP image.

Figure 20A:
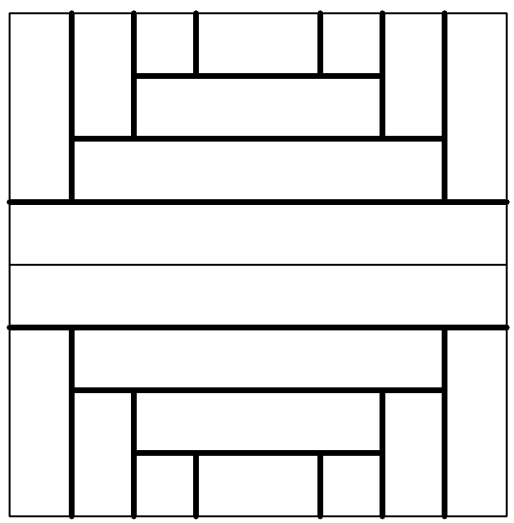
Figure 20B:
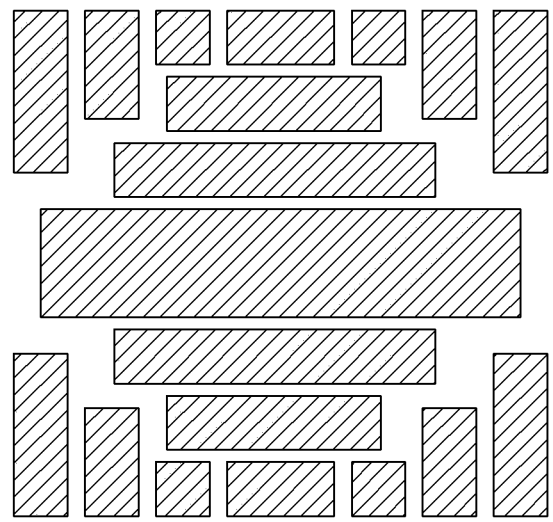
Figure 21:
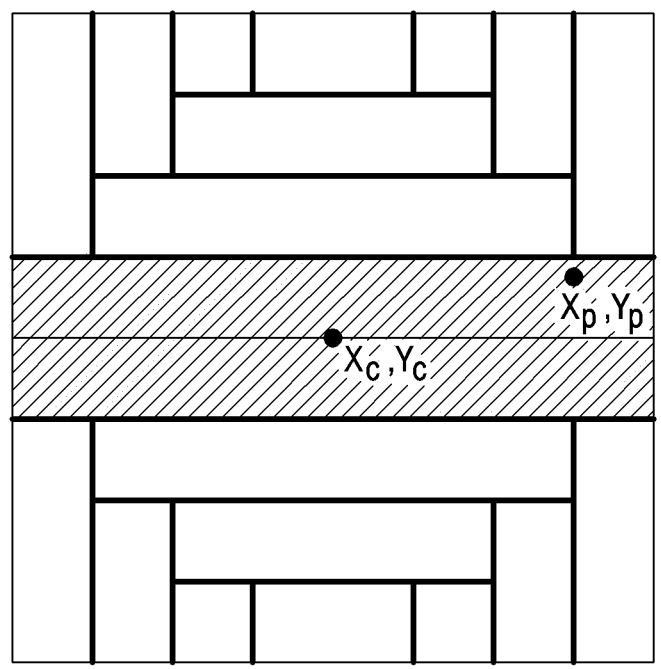

To prevent (reduce) blocking artifact in the tile-based SERP image, there is proposed a scheme for extending the projection range to the center of each tile where a blocking artifact occurs as shown in FIGS. 20 and 21.

Figure 22:
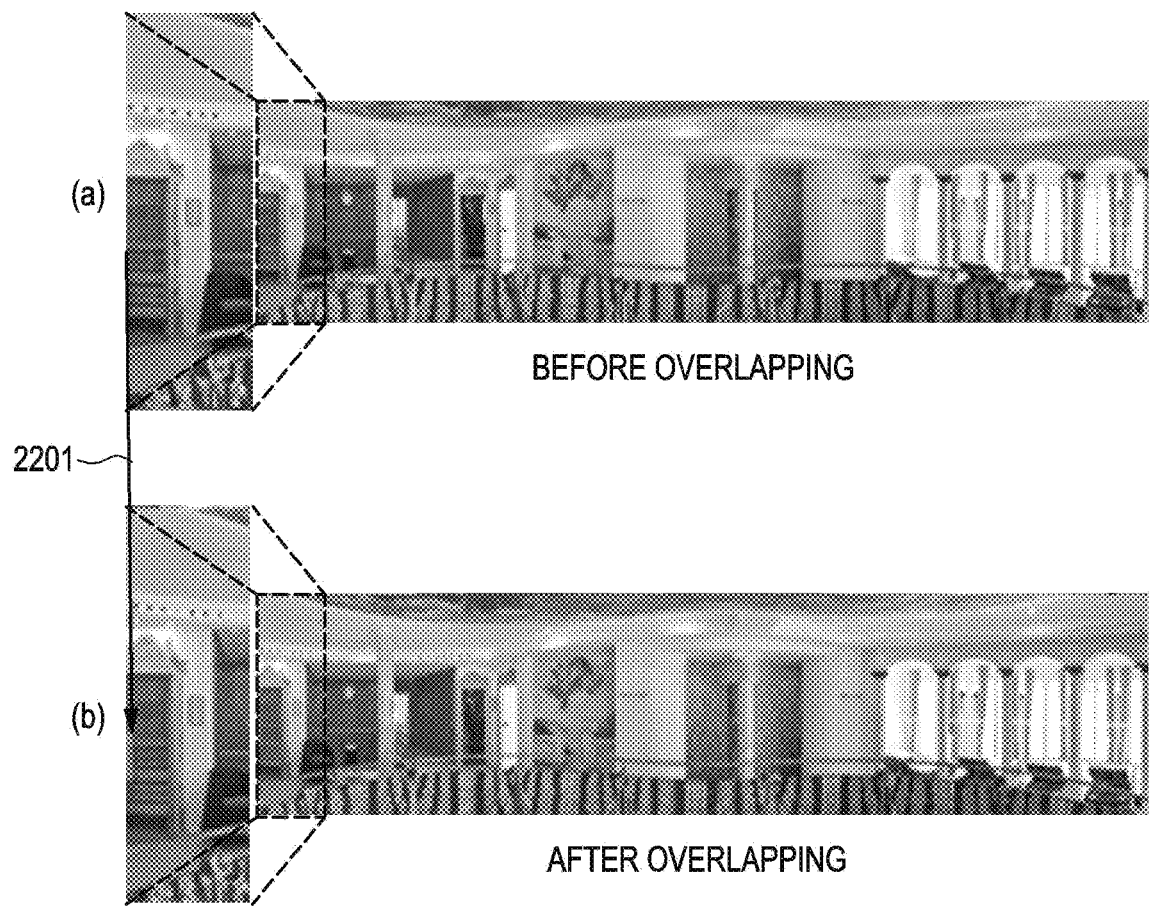
Figure 23:
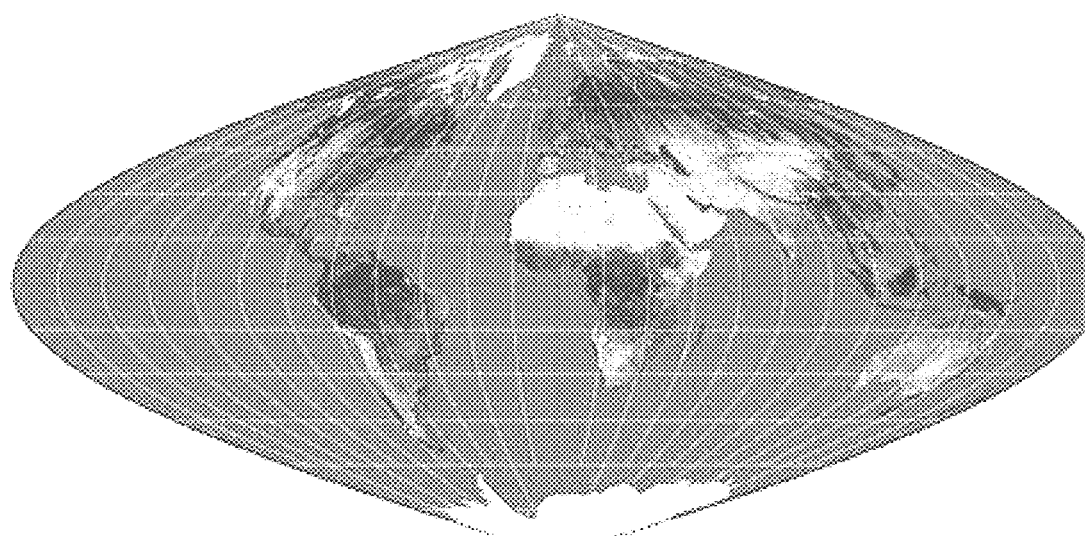
FIGS. 23 to 31 are views illustrating an image projecting scheme for VR content according to the third embodiment of the present invention.

FIG. 20(a) illustrates tile boundaries in an 8 tile-based SERP image. FIG. 20(b) illustrates tile units in an 8 tile-based SERP image where a blocking artifact may occur. In the example shown in FIG. 21, when the coordinates of the spherical image represented by each point c and p are extended (i.e., overlapping process) to the tile center with the size of the SERP image fixed, the projection range of the SERP image may be extended as indicated with reference number 2201 of FIG. 22, rendering blocking artifacts less frequent. FIG. 22(a) illustrates the image in the tile center in the SERP image before the overlapping process, and FIG. 22(b) illustrates the image in the tile center in the SERP image before the overlapping process.

Equation 4 below represents an example of a coordinate conversion equation to extend the coordinates represented by each point c and p to the tile center. In Equation 4 below, the angles λ and φ, respectively, refer to the longitude and latitude in the spherical image.

$$\lambda'_p = \lambda_c + (\lambda_p - \lambda_c) \cdot \sigma_\lambda$$

$$\phi'_p = \phi_c + (\phi_p - \phi_c) \cdot \sigma_\phi \qquad \text{Equation 4}$$

$x_c, y_c$: Coordinates of the center of each tile. (0,0) in this example $x_p, y_p$: Coordinates of p $\lambda_c, \phi_c$: Spherical coordinates of the center of each tile. (0,0) in this example $\lambda_p, \phi_p$: Spherical coordinates of p (before overlapping)

$\lambda'_p, \phi'_p$: Spherical coordinates of p (after overlapping)

An image projecting scheme for VR content according to a fifth embodiment of the present invention is described below with reference to FIGS. 23 to 31.

Figure 31:
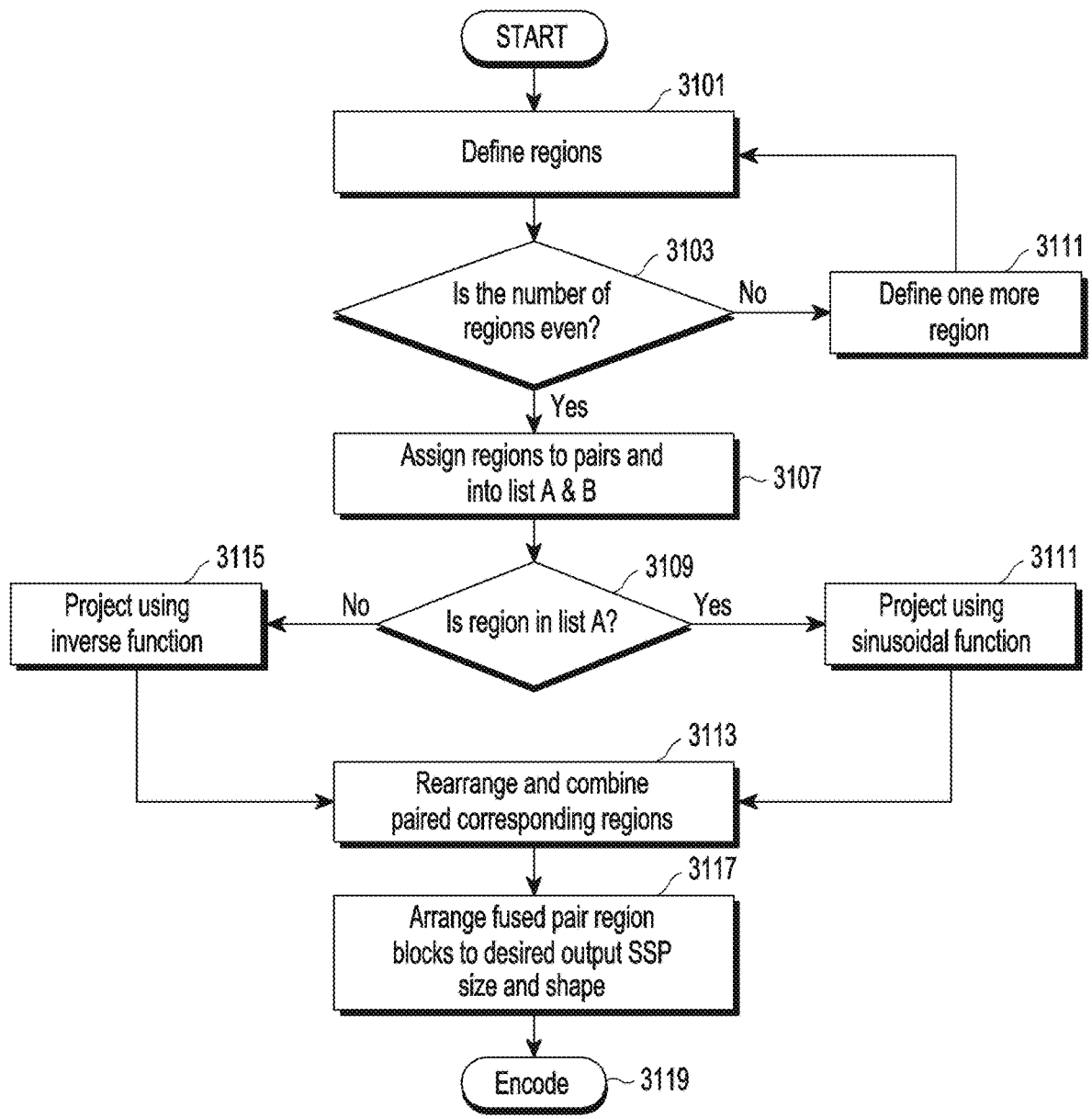

FIG. 31 is a view illustrating an image projection scheme for VR content according to the fifth embodiment of the present invention, an example of squared sinusoidal projection (hereinafter, "SSP").

The coordinate conversion from the spherical image as shown in FIG. 2(a) to the SERP image may be performed as per Equation 5 below. In Equation 5 below, the angles λ and φ, respectively, refer to the longitude and latitude in the spherical image.

$$x = \lambda \cdot \cos \varphi$$

$$y = \varphi \qquad \text{Equation 5}$$

FIG. 5 is a view illustrating an image projection scheme for VR content according to the fifth embodiment of the present invention, a scheme for splitting a spherical image to project an SSP image from the spherical image.

Figure 24:
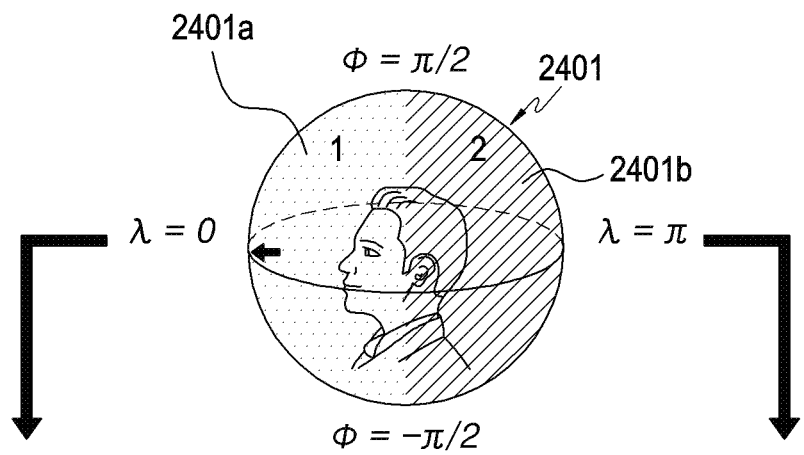
Figure 24:
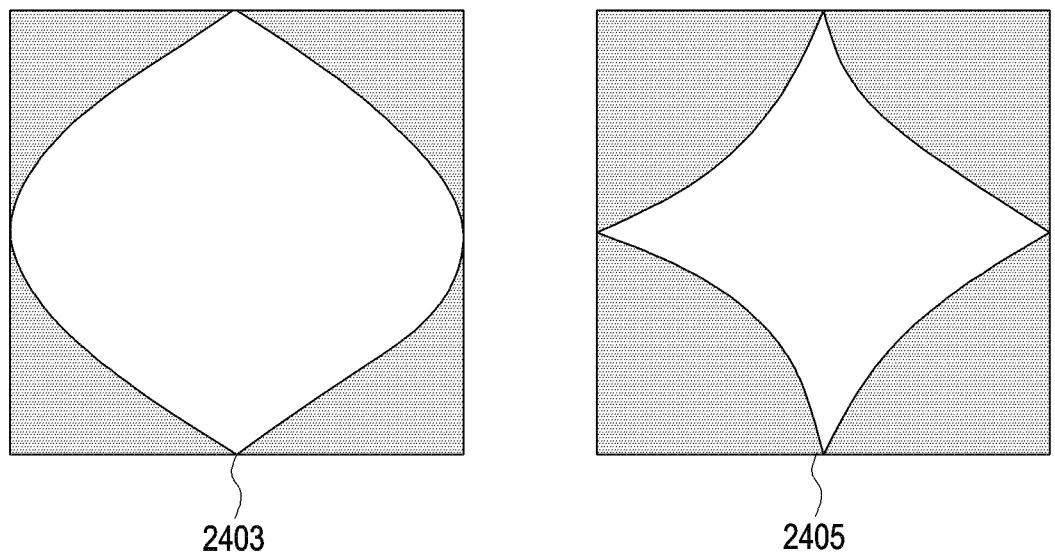

Referring to FIG. 24, a spherical image 2401, e.g., a 360-degree image, may be divided in half into two regions, front region1 2401a and back region2 2401b. However, unlike the above-described ERP image, the SSP image depends upon the scheme in which the regions 2401a and 2401b are defined in the spherical image 2401. In the example of FIG. 24, region1 2401a is projected to a first white region in the square denoted with reference number 2403, and region2 2401b is projected to a second white region in the square denoted with reference number 2405. In the two squares 2403 and 2405, image data exists only in the first and second white regions, and the other regions (shown in hatching) than the first and second white regions are filled with padded data (or no data).

When region1 2401a corresponding to the front part of the spherical image is projected to the first white region in the example of FIG. 24, coordinate conversion may be performed using Equation 5. When region2 2401b corresponding to the back part of the spherical image is projected to the second white region, coordinate conversion may be performed using Equation 6.

$$x = \lambda \cdot (1 - |\sin \varphi|)$$

$$y = \varphi \qquad \text{Equation 6}$$

Figure 25:
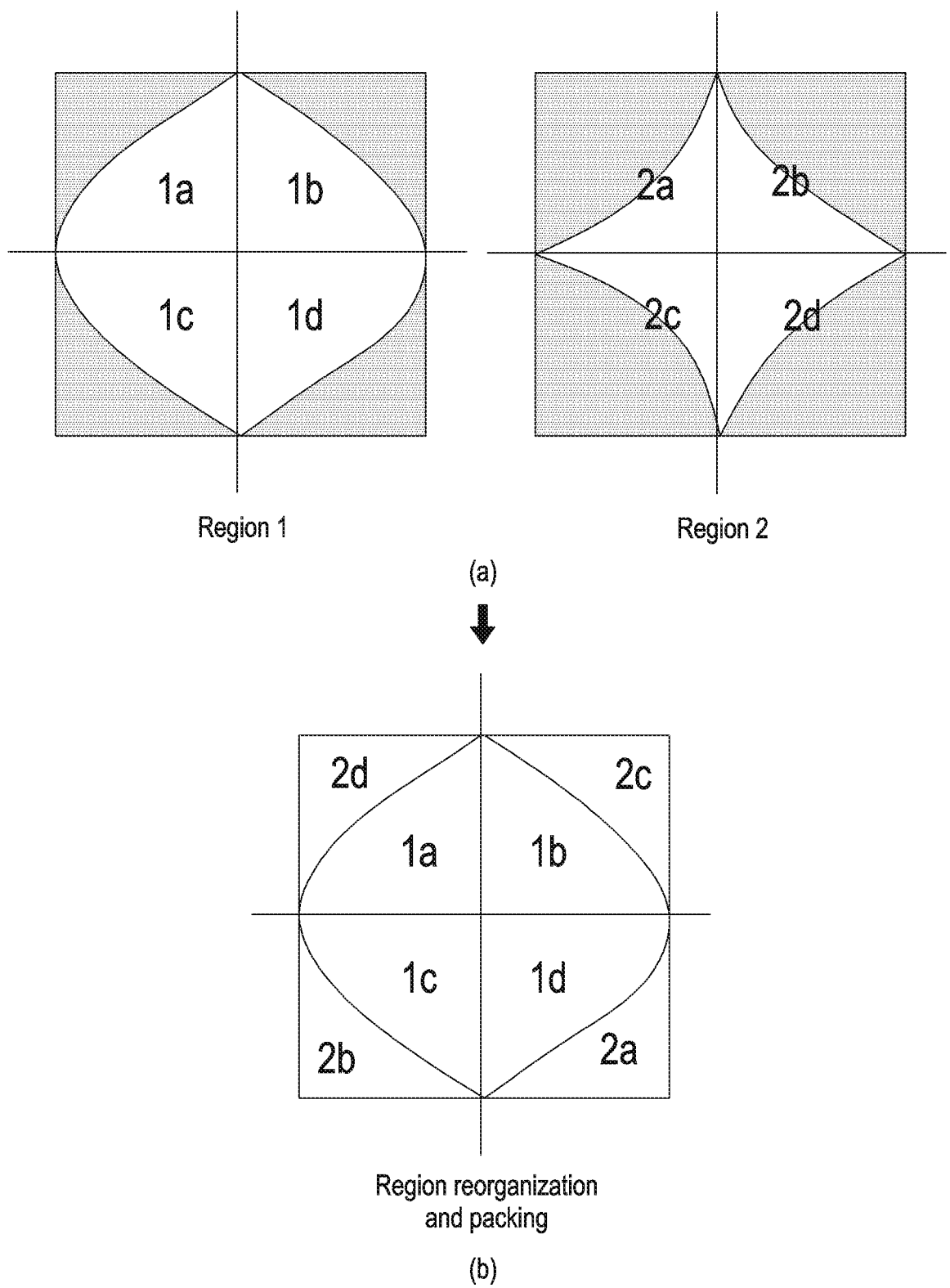

FIG. 25 is a view illustrating an image projection scheme for VR content according to the fifth embodiment of the present invention, a scheme for projecting an SSP image from a spherical image. (a) and (b) of FIG. 25 illustrate an example of a projecting scheme for reorganizing the second white region of FIG. 24 to fill the empty regions of the square where the first white region belongs. In the example of FIG. 25, the first and second white regions each include four distinct sub regions. In FIGS. 25(a) and 25(b), the sub regions corresponding to each other are denoted with the same reference denotations. The reorganized image as shown in FIG. 25(b) is used as an SSP image.

Figure 26:
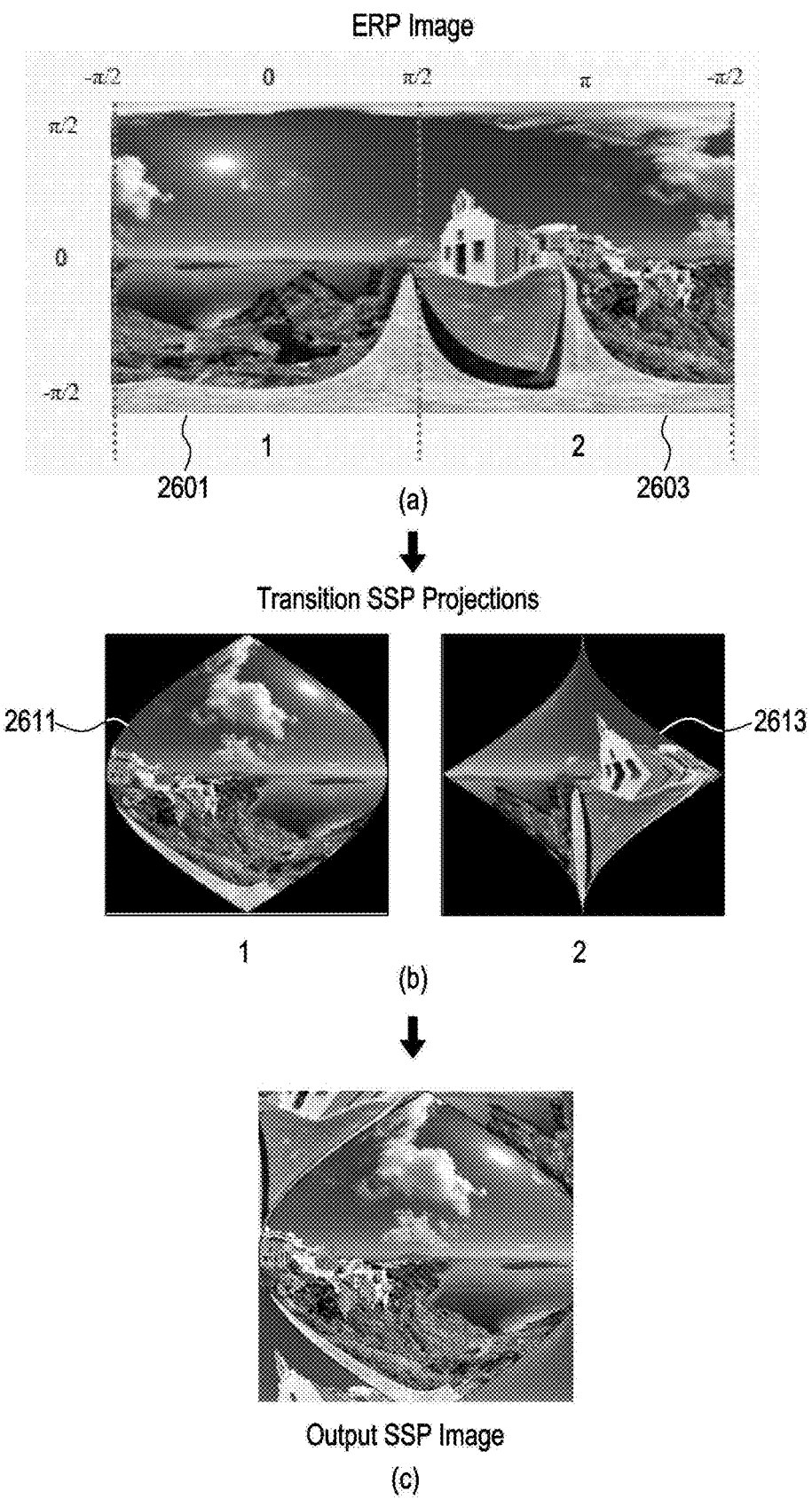

FIG. 26 is a view illustrating an image projection scheme for VR content according to the fifth embodiment of the present invention, a scheme for projecting an SSP image from an ERP image.

FIG. 26(a) illustrates an example of an ERP image in which a front part of a spherical image is projected to a front region 2601, and a back part of the spherical image is projected to a back region 2603. FIG. 26(b) illustrates an example of a transformed image in the middle of projecting the SSP image from the ERP image. The transformed image is an image with two squares including the first and second white regions 2611 and 2613 as shown in FIG. 25. The front region 2601 corresponds to the first white region 2611, and the back region 2603 corresponds to the second white region 2613. FIG. 26(c) illustrates an example of an SS image resulting from reorganizing the second white region 2613 and filling the empty region of the square where the first white region 2611 belongs. Thus, the ERP image may be projected to the SSP image by the process of (a)=>(b)=>(c) of FIG. 26.

Figure 27:
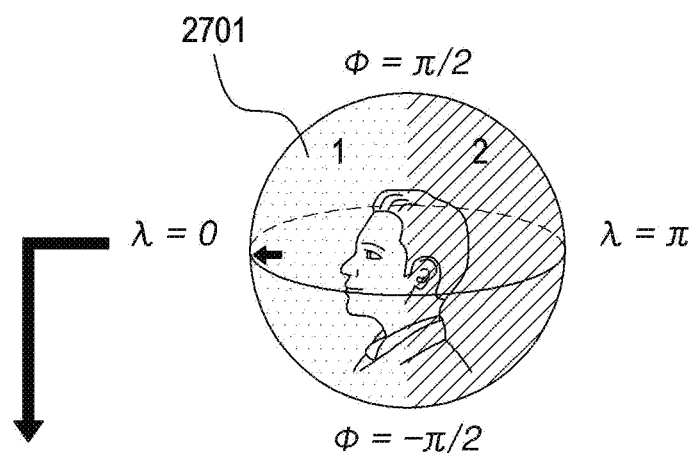
Figure 27:
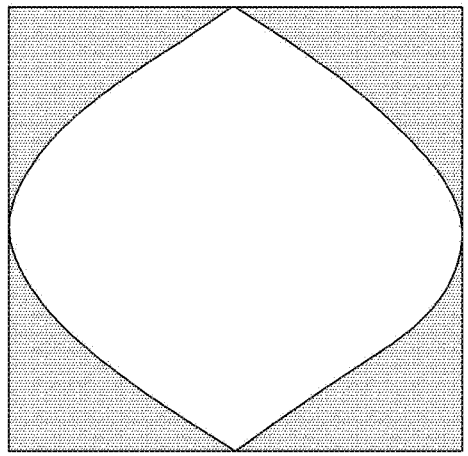
Figure 27:
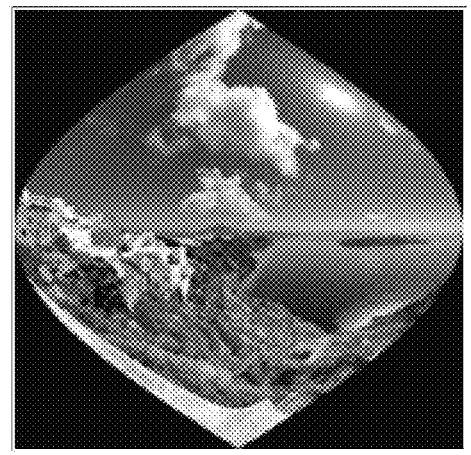
Figure 28:
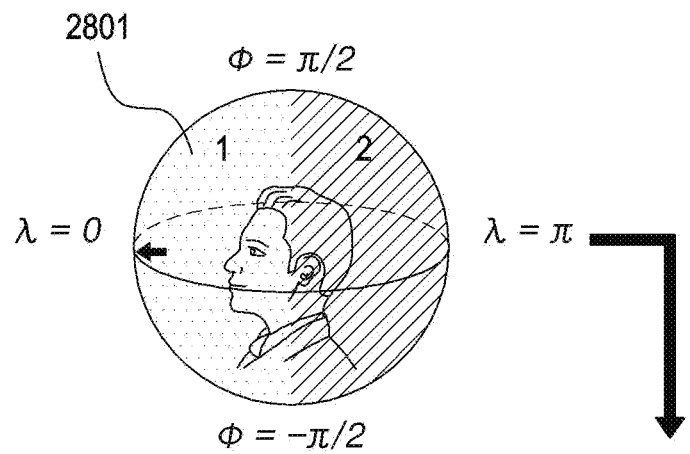
Figure 28:
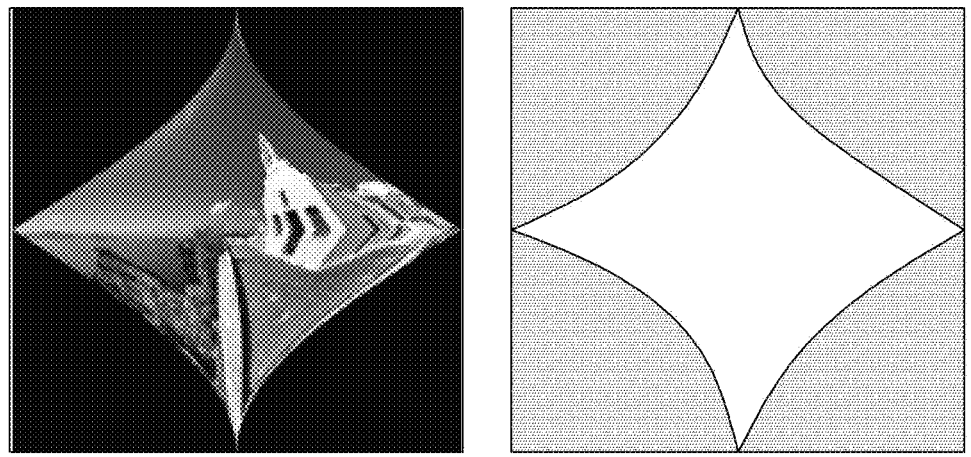

FIGS. 27 and 28 illustrate an example of an image transformation process for projecting an SSP image from a spherical image. FIG. 27 illustrates a process for converting coordinates from a front region1 2701 of the spherical image to a planar image, and FIG. 28 illustrates a process for converting coordinates from a back region2 2801 of the spherical image to a planar image. As an equation for converting coordinates in FIG. 27, Equation 5 may be used, and as an equation for converting coordinates in FIG. 28, Equation 6 may be used.

In the above-described embodiments, the projection scheme may be performed in other various modifications, e.g., a scheme for performing image transformation in the order of the spherical image=>ERP image=>SERP image, a scheme for performing image transformation in the order of the spherical image=>ERP image=>SSP image, a scheme for projecting SERP image directly from spherical image, and a scheme for projecting SSP image directly from spherical image. In the above-described embodiments, although examples in which the projection schemes are performed with the image divided into two or four (sub) regions for convenience have been described, the image may be divided into two or more (sub) regions considering (meeting) the points in the image which the user is interested in.

Figure 29:
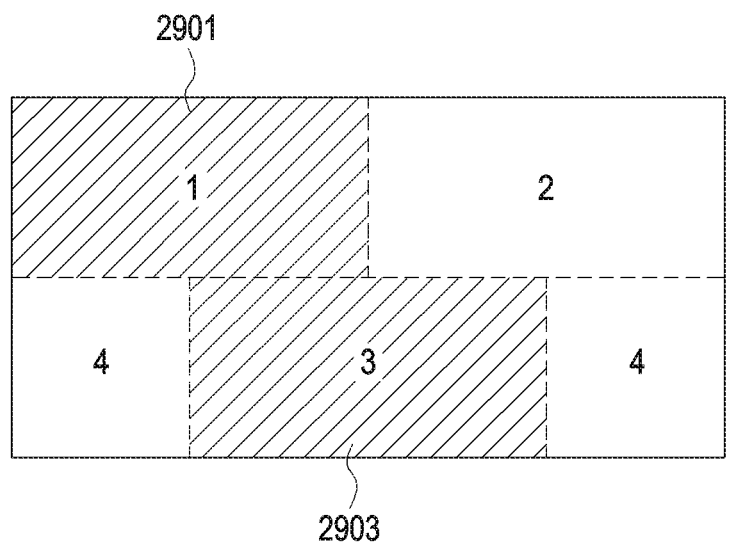

In the example of FIG. 26, the shape of the image transformed (FIG. 26(b)) may be transformed to remain the same in the number of pixels in the equator (middle horizontal line) compared to the ERP. The transformed image (FIG. 26(b)) for SSP uses the sampling fraction that reduces as per the sinusoidal function to allow only one sample to be present at the top of the SSP, and the sampling fraction may be, e.g., 1/N, wherein N is the original number of horizontal samples in the ERP image. A difference in shape between the first and second regions of the transformed image may be implemented using an equation (e.g., Equation 5 or Equation 6) representing the sinusoidal function (or its inverse function). Such a difference in shape between the regions may be identified as a "region(s) of interest" and a "region(s) of no interest." The regions of no interest include regions of relatively less interest. The "region(s) of interest" projected using the sinusoidal function have more data compared to the "region(s) of no interest" projected using the inverse function. According to an embodiment of the present invention, the SSP scheme is not limited as defining two regions. In a 360-degree image, a region(s) of interest and a region(s) of no interest may be identified (or divided). The region of interest may correspond to a front part (region) in the spherical image (or ERP image), and the region of no interest may correspond to a back part (region) of the spherical image (or ERP image). FIG. 29 illustrates an example of an ERP frame divided into, e.g., four different regions (region 1 to region 4) for SSP. In FIG. 29, reference numbers 2901 and 2903 correspond to the regions of interest, and the other regions correspond to regions of no interest.

According to an embodiment of the present invention, 1) through 3) below are some conditions for defining regions for projection.

Figure 30:
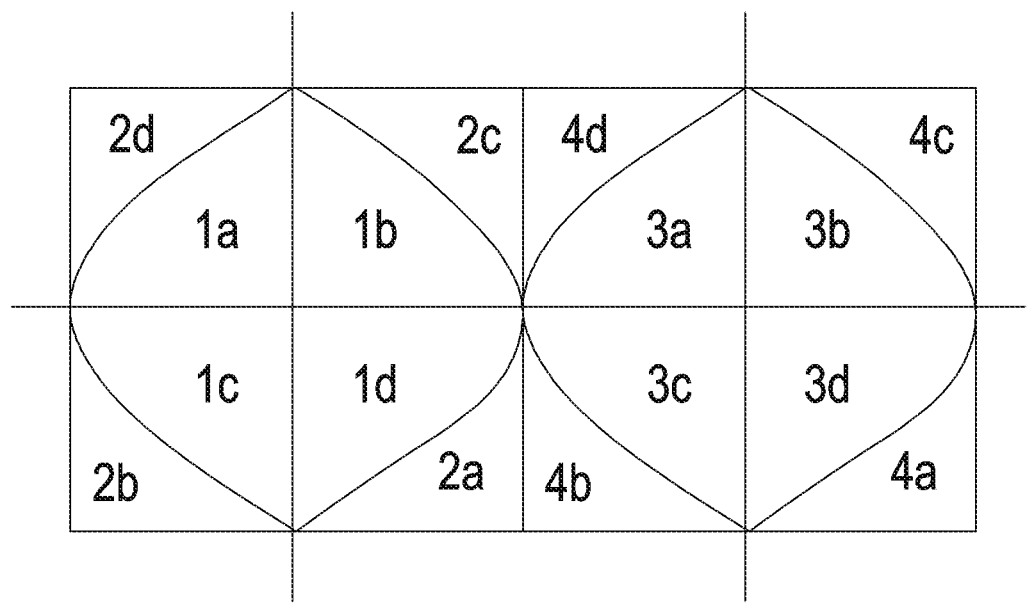

1) the number of regions defined is an even number 2) each region of interest may be paired with a corresponding region of no interest 3) in the case of a 360-degree image or ERP image, pairs of regions may have the same shape Relying on an input for encoding, the final output of SSP image is not necessarily a square as in the example of FIG. 30. FIG. 30 illustrates an example of a final output of an SSP image corresponding to an ERP image. A pair of regions may be mapped to regions with different sizes in the SSP image through resolution scaling, and rearrangement of the pair of regions may be rendered flexible and fit the user's preference in each content.

FIG. 31 is a flowchart illustrating an image projecting scheme for VR content according to the fifth embodiment of the present invention, an example of a scheme in which, in an SSP image, a sinusoidal function or its inverse function is used to project the image, and regions corresponding to the pair are allocated.

Referring to FIG. 31, regions for image projection are defined in step 3101. In step 3103, it is determined whether the number of the regions is an odd number or even number, and unless an even number, step 3105 is performed to define one more region. When the number of the regions is an even number in step 3103, step 3017 is performed to allocate the regions in pairs and to list the regions, with the regions divided into regions of interest and regions of no interest. Thereafter, when a region for projection is within the regions of interest in step 3109, projection is performed using a sinusoidal function in step 3111. When the region for projection is within the regions of no interest, projection is performed using the inverse function in step 3115. Thereafter, the regions corresponding to the pairs are rearranged and combined in step 3113. The pairs of regions bundled up in a desired SSP image size and shape are arranged.

The invention claimed is:

1. A method for processing an omnidirectional image, the method comprising:

obtaining a first planar image projected from a spherical image using equirectangular projection (ERP), wherein the first planar image includes a first region corresponding to a front part of the spherical image and at least one second region corresponding to a back part of the spherical image;

generating a second planar image having a shape of a rhombus by sampling the first planar image according to a sampling rate which is gradually decreased from an equator of the second planar image to poles of the second planar image, using a coordinate conversion given by $y=\phi H/\pi$, $x=\lambda W/2\pi \cdot (1-2|y|/H)$, wherein angles $\lambda$ and $\phi$, respectively, refer to a longitude and a latitude of the first planar image and W and H, respectively, refer to a horizontal length and a vertical length of the second planar image;

generating a third planar image which has a shape of a rectangle based on the second planar image; and encoding the third planar image.

2. The method of claim 1, further comprising:

sampling the first planar image including performing row-based downsampling on the first planar image.

3. The method of claim 1, wherein the second planar image comprises a projected image including at least two rhombus shapes each of which corresponds to a respective one of the front part or the back part of the spherical image.

4. The method of claim 1, wherein the second planar image comprises a projected image in which sub regions corresponding to the front part and the back part of the spherical image fill one square-shaped image.

5. The method of claim 1, wherein third regions of the second planar image corresponding to the first region of the first planar image are larger than fourth regions of the second planar image corresponding to the at least one second region of the first planar image.

6. The method of claim 1, wherein the second planar image is generated by applying a sinusoidal function to the first region in the first planar image and applying an inverse sinusoidal function to the at least one second region in the first planar image.

7. The method of claim 1, wherein a higher number of pixels are located in the equator of the second planar image than in each pole of the second planar image, and wherein pixels of an equator of the first planar image correspond to pixels of an equator of the spherical image and pixels of each pole of the first planar image correspond to pixels of each pole of the spherical image.

8. The method of claim 7, wherein a same number of pixels are located in the equator of the first planar image as are located in each pole of the first planar image.

9. The method of claim 1, wherein the front part of the first planar image corresponds to a front part of the second planar image, and wherein the back part of the first planar image corresponds to a back part of the second planar image.

10. A device for processing an omnidirectional image, comprising:

a transceiver; and at least one processor coupled to the transceiver, wherein the at least one processor is configured to:

obtain a first planar image projected from a spherical image using equirectangular projection (ERP), wherein the first planar image includes a first region corresponding to a front part of the spherical image and at least one second region corresponding to a back part of the spherical image, generate a second planar image having a shape of a rhombus by sampling the first planar image according to a sampling rate which is gradually decreased from an equator of the second planar image to poles of the second planar image, using a coordinate conversion given by $y=\phi H/\pi$, $x=\lambda W/2\pi \cdot (1-2|y|/H)$, wherein angles $\lambda$ and $\phi$, respectively, refer to a longitude and a latitude of the first planar image and W and H, respectively, refer to a horizontal length and a vertical length of the second planar image, generate a third planar image which has a shape of a rectangle based on the second planar image, and encode the third planar image.

11. The device of claim 10, wherein the at least one processor is further configured to:

sample the first planar image including performing row-based downsampling on the first planar image.

12. The device of claim 10, wherein the second planar image comprises a projected image including at least two rhombus shapes each of which corresponds to a respective one of the front part or the back part of the spherical image.

13. The device of claim 10, wherein the second planar image comprises a projected image in which sub regions corresponding to the front part and the back part of the spherical image fill one square-shaped image.

14. The device of claim 10, wherein third regions of the second planar image corresponding to the first region of the first planar image are larger than fourth regions of the second planar image corresponding to the at least one second region of the first planar image.

15. The device of claim 10, wherein the second planar image is generated by applying a sinusoidal function to the first region in the first planar image and applying an inverse sinusoidal function to the at least one second region in the first planar image.

* * * * *